United States Patent
Atwell et al.

(10) Patent No.: US 9,772,173 B2
(45) Date of Patent: Sep. 26, 2017

(54) METHOD FOR MEASURING 3D COORDINATES OF A SURFACE WITH A PORTABLE ARTICULATED ARM COORDINATE MEASURING MACHINE HAVING A CAMERA

(71) Applicant: FARO Technologies, Inc., Lake Mary, FL (US)

(72) Inventors: Paul C. Atwell, Lake Mary, FL (US); Yu Gong, Oviedo, FL (US)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 435 days.

(21) Appl. No.: 14/315,554

(22) Filed: Jun. 26, 2014

(65) Prior Publication Data
US 2015/0002659 A1    Jan. 1, 2015

Related U.S. Application Data

(60) Provisional application No. 61/840,180, filed on Jun. 27, 2013.

(51) Int. Cl.
| | |
|---|---|
| *G01C 11/06* | (2006.01) |
| *G01B 5/008* | (2006.01) |
| *G01B 11/00* | (2006.01) |
| *G06T 7/55* | (2017.01) |

(52) U.S. Cl.
CPC ............ *G01B 5/008* (2013.01); *G01B 11/007* (2013.01); *G06T 7/55* (2017.01)

(58) Field of Classification Search
None
See application file for complete search history.

(56) References Cited

U.S. PATENT DOCUMENTS

| | | | |
|---|---|---|---|
| 5,402,582 | A | 4/1995 | Raab |
| 5,611,147 | A | 3/1997 | Raab |
| 5,821,943 | A | 10/1998 | Shashua |

(Continued)

FOREIGN PATENT DOCUMENTS

| | | |
|---|---|---|
| EP | 0631250 A2 | 12/1994 |
| EP | 1033679 A1 | 9/2000 |

(Continued)

OTHER PUBLICATIONS

Notification of Transmittal of the International Search Report of the International Searching Authority, or the Declaration; PCT/US2014/044501; Dec. 23, 2014. 6 Pages.

(Continued)

*Primary Examiner* — Dave Czekaj
*Assistant Examiner* — Tyler W Sullivan
(74) *Attorney, Agent, or Firm* — Cantor Colburn LLP

(57) ABSTRACT

A method for measuring three-dimensional (3D) coordinates of a surface includes providing a manually positionable articulated arm portion having opposed first and second ends, providing a measurement device coupled to the first end, the measurement device including a camera having a lens and a photosensitive array and moving the camera to first and second positions and orientations to capture first and second images. Based on data from the camera, a first set of cardinal points common to the first and images and the second images are used to form a 3D coordinates that describe the surface.

16 Claims, 33 Drawing Sheets

(56) References Cited

U.S. PATENT DOCUMENTS

| | | | |
|---|---|---|---|
| 6,175,647 B1 | 1/2001 | Schick et al. | |
| 6,421,629 B1* | 7/2002 | Ishiyama | G01B 11/255 |
| | | | 702/159 |
| 6,711,293 B1 | 3/2004 | Lowe | |
| 7,352,446 B2 | 4/2008 | Bridges et al. | |
| 7,800,758 B1 | 9/2010 | Bridges et al. | |
| 8,467,072 B2 | 6/2013 | Cramer et al. | |
| 8,525,983 B2 | 9/2013 | Bridges et al. | |
| 9,064,312 B2* | 6/2015 | Majumder | H04N 9/3147 |
| 9,091,536 B2* | 7/2015 | Hausler | A61B 5/0062 |
| 9,402,070 B2 | 7/2016 | Tohme et al. | |
| 2002/0094134 A1* | 7/2002 | Nafis | G06T 17/10 |
| | | | 382/285 |
| 2005/0166413 A1* | 8/2005 | Crampton | B25J 13/088 |
| | | | 33/503 |
| 2007/0091174 A1* | 4/2007 | Kochi | G01B 11/2509 |
| | | | 348/135 |
| 2008/0024484 A1 | 1/2008 | Naimark | |
| 2008/0075324 A1* | 3/2008 | Sato | G01B 11/2504 |
| | | | 382/106 |
| 2011/0178764 A1* | 7/2011 | York | G01B 5/008 |
| | | | 702/152 |
| 2012/0148100 A1* | 6/2012 | Kotake | G06T 7/0046 |
| | | | 382/103 |
| 2012/0206716 A1 | 8/2012 | Cramer et al. | |
| 2012/0257017 A1 | 10/2012 | Pettersson et al. | |
| 2013/0096873 A1 | 4/2013 | Rosengaus et al. | |
| 2013/0238124 A1* | 9/2013 | Suzuki | B25J 9/16 |
| | | | 700/250 |
| 2013/0293684 A1* | 11/2013 | Becker | G01B 11/245 |
| | | | 348/47 |
| 2013/0314689 A1* | 11/2013 | Jones | G01B 21/047 |
| | | | 356/4.01 |
| 2014/0028805 A1 | 1/2014 | Tohme | |
| 2014/0063489 A1* | 3/2014 | Steffey | G01S 17/023 |
| | | | 356/72 |
| 2014/0139639 A1 | 5/2014 | Wagner et al. | |
| 2014/0192187 A1* | 7/2014 | Atwell | G01B 11/25 |
| | | | 348/136 |
| 2015/0365653 A1* | 12/2015 | Tohme | G01B 11/14 |
| | | | 348/46 |

FOREIGN PATENT DOCUMENTS

| | | |
|---|---|---|
| EP | 2031558 A2 | 3/2009 |
| JP | 2011085971 A | 4/2011 |
| WO | 2011134083 A1 | 11/2011 |

OTHER PUBLICATIONS

Notification of Transmittal of the International Written Opinion of the International Searching Authority, or the Declaration; PCT/US2014/044501; Dec. 23, 2014. 9 Pages.

International Search Report and Written Opinion for Application No. PCTUS2015/044409 Issued Oct. 23, 2015; 9 pgs.

http://en.wikipedia.org/wiki/Augmented_reality.

International Search Report and Written Opinion for Application No. PCT/US2015/035001 dated Dec. 14, 2015; 13 pgs.

\* cited by examiner

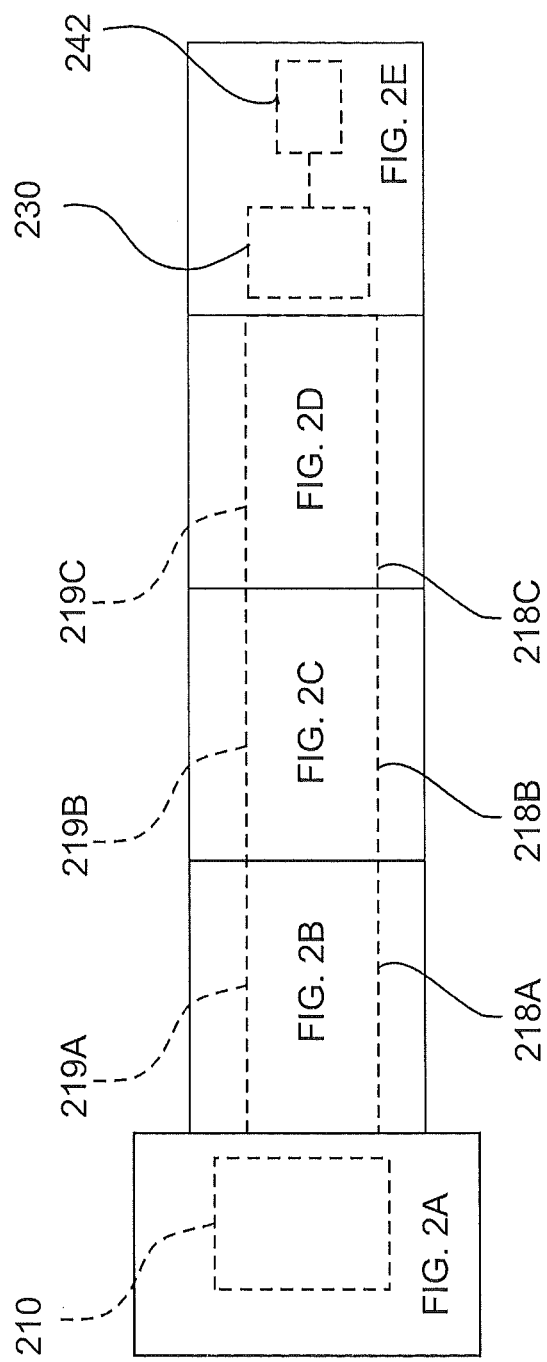

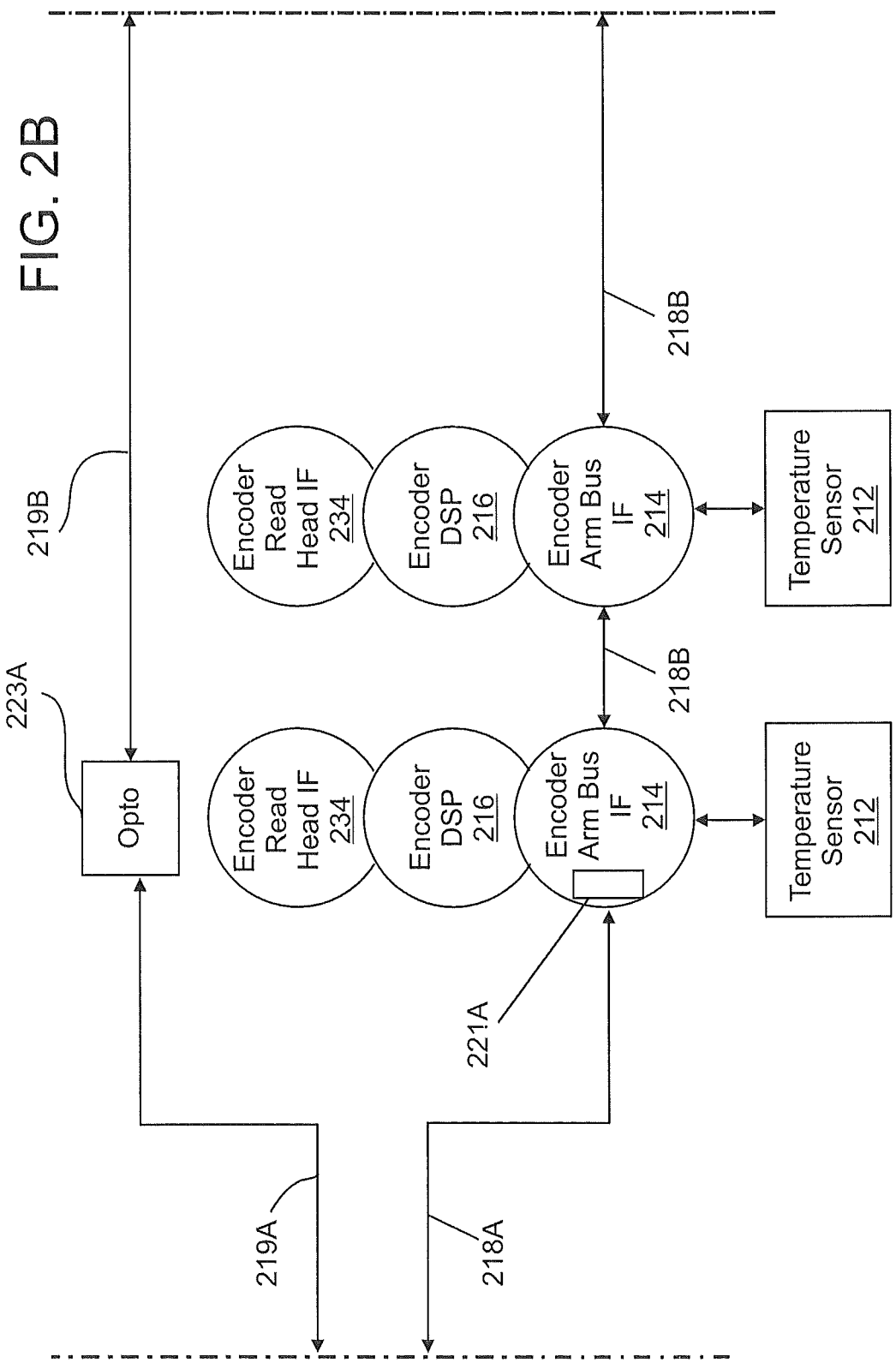

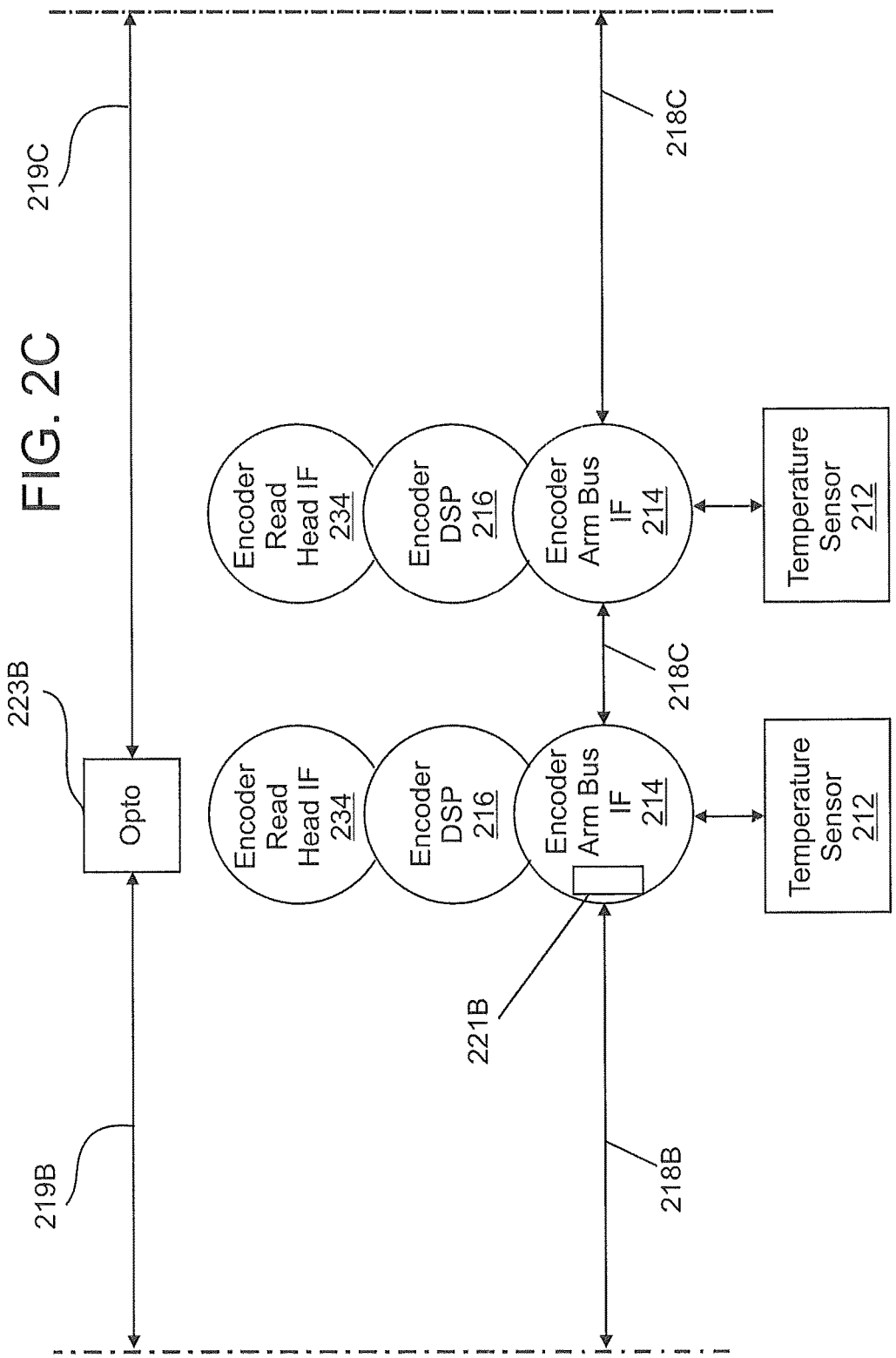

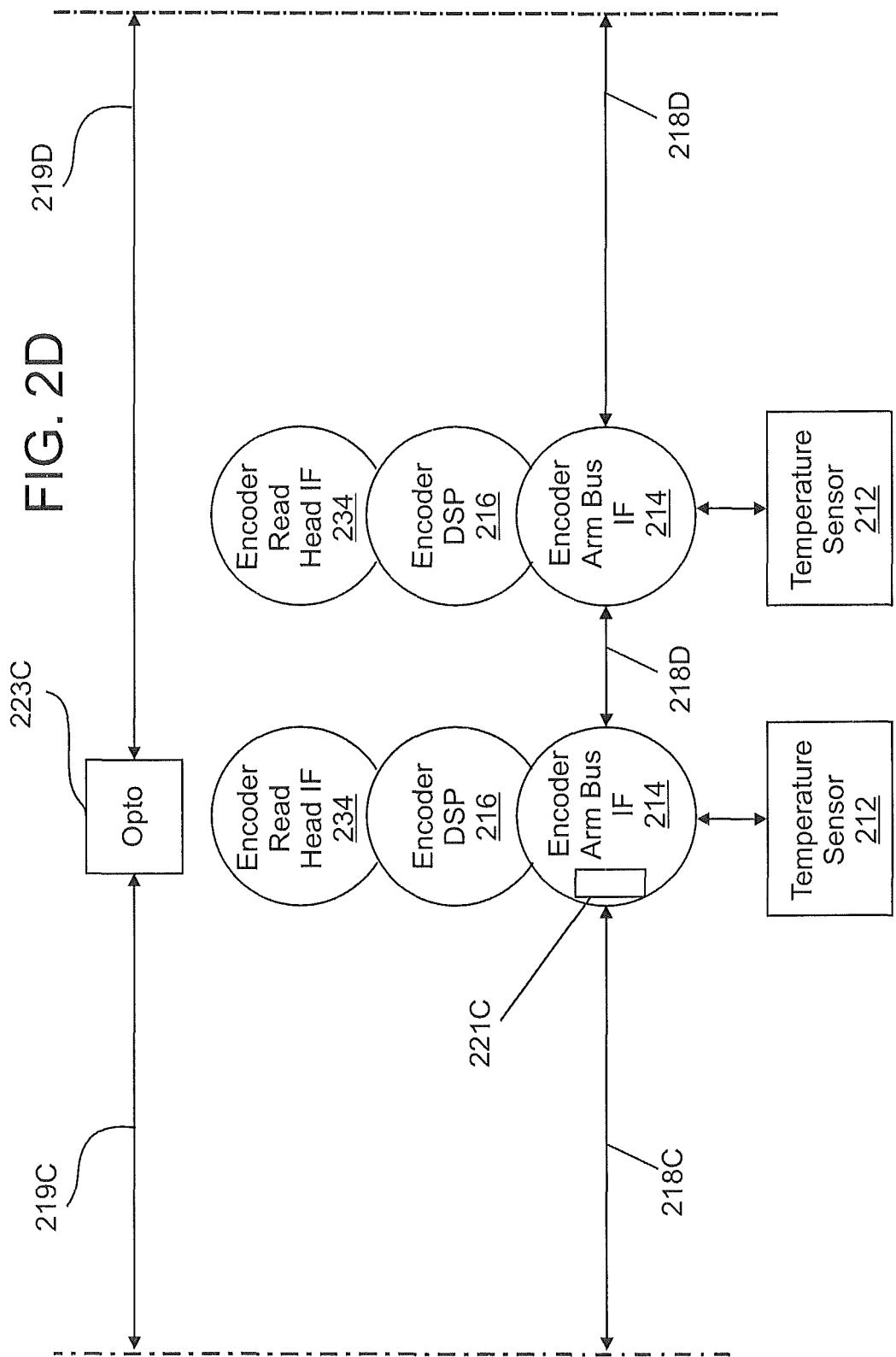

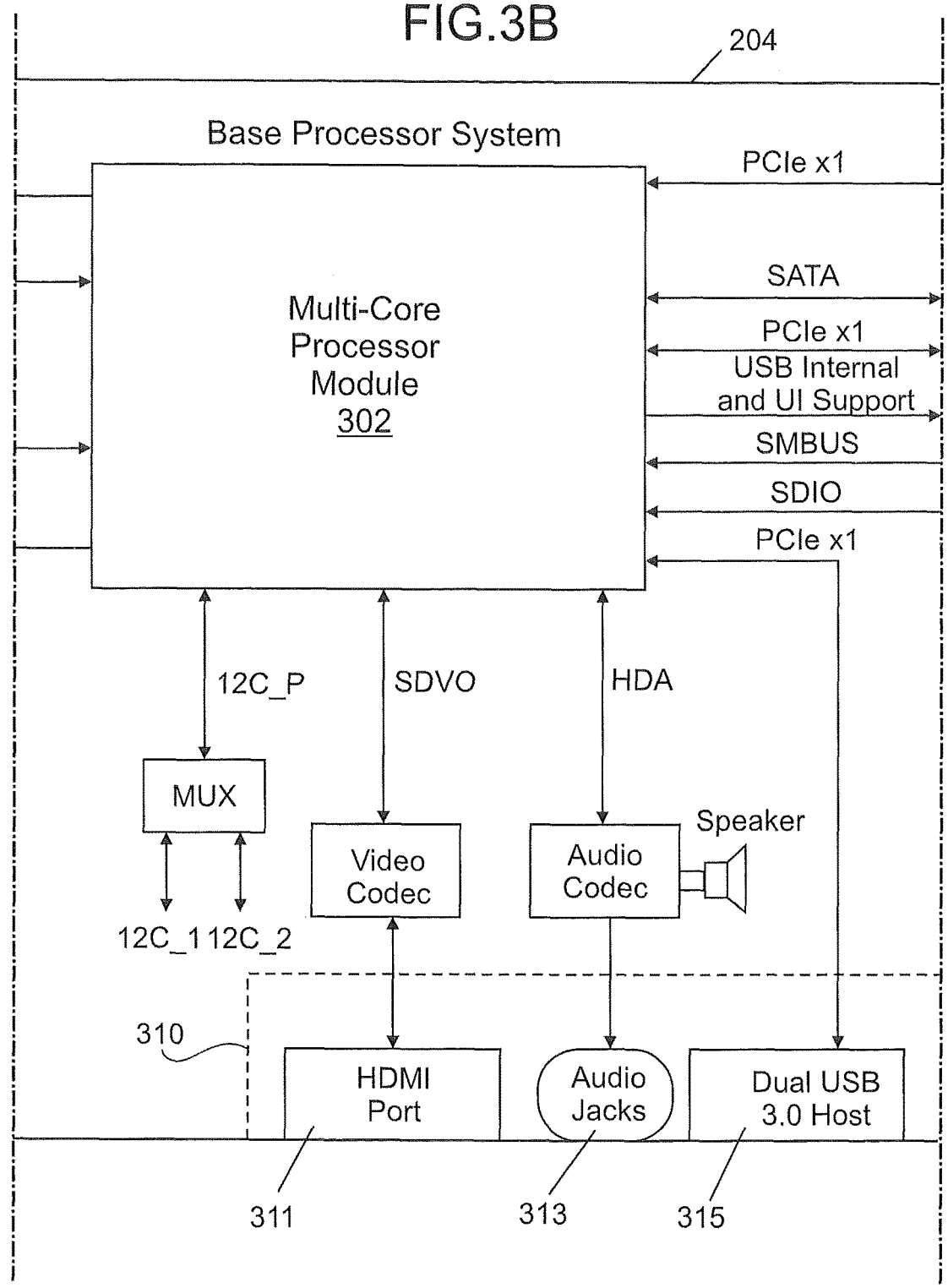

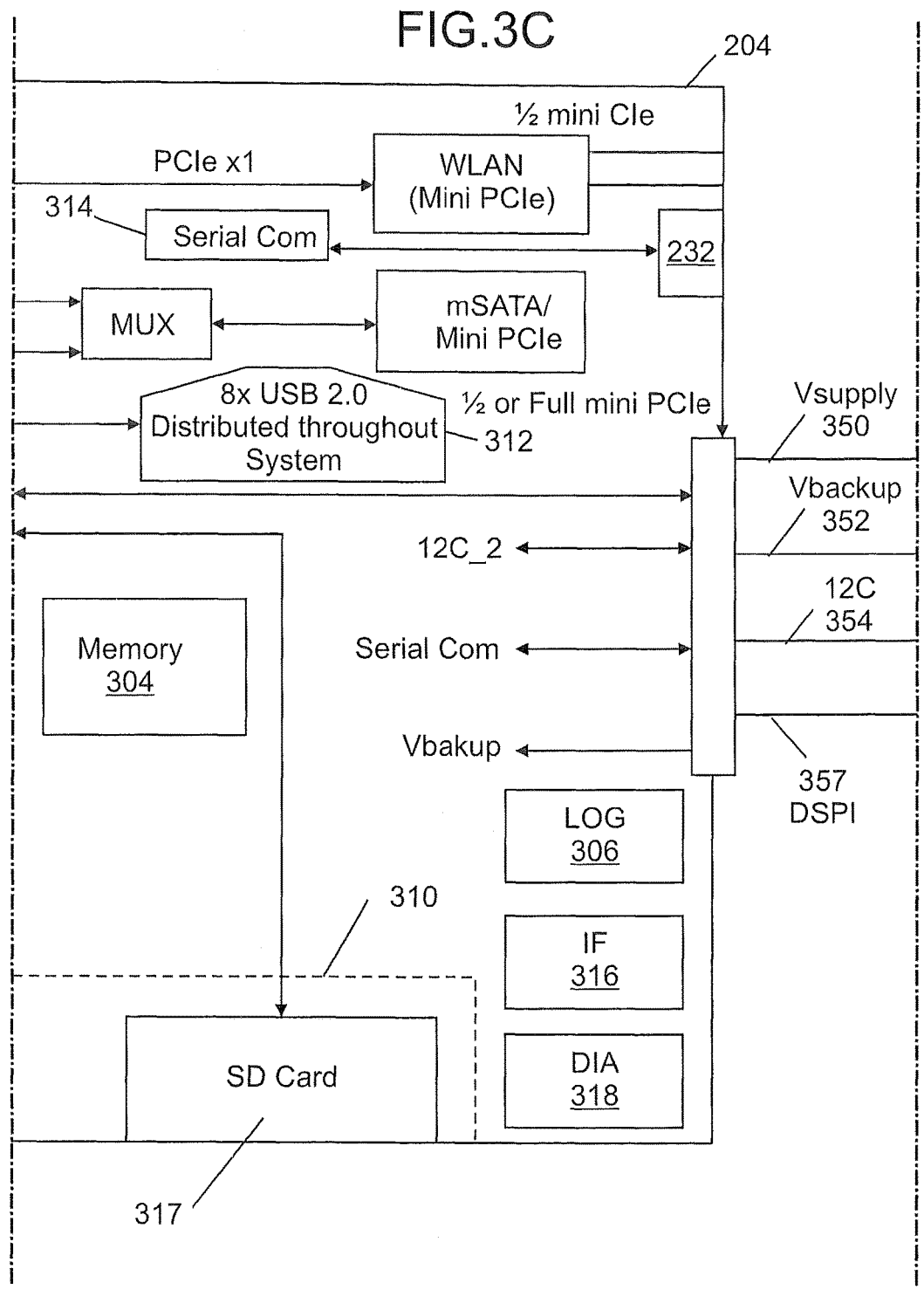

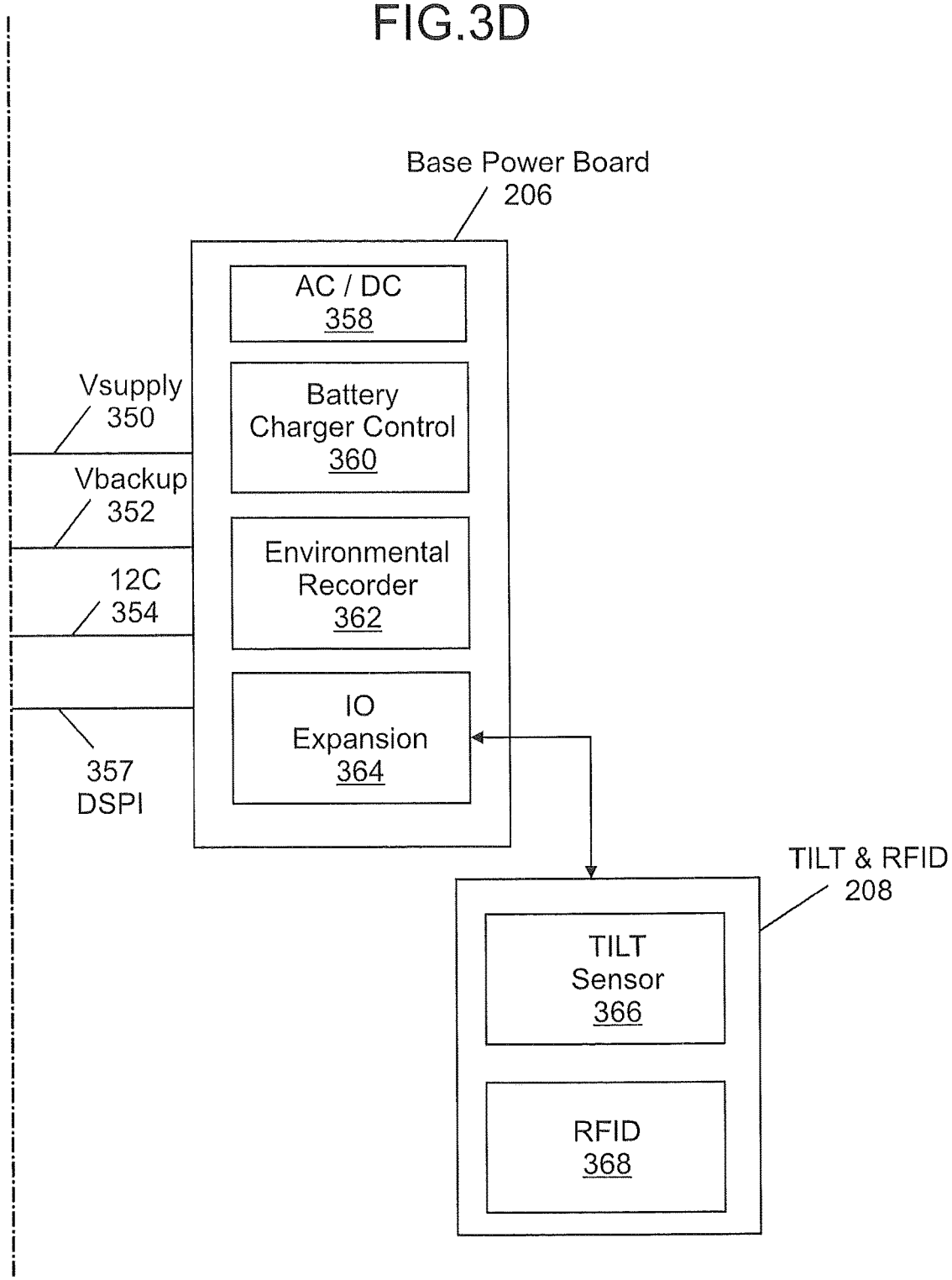

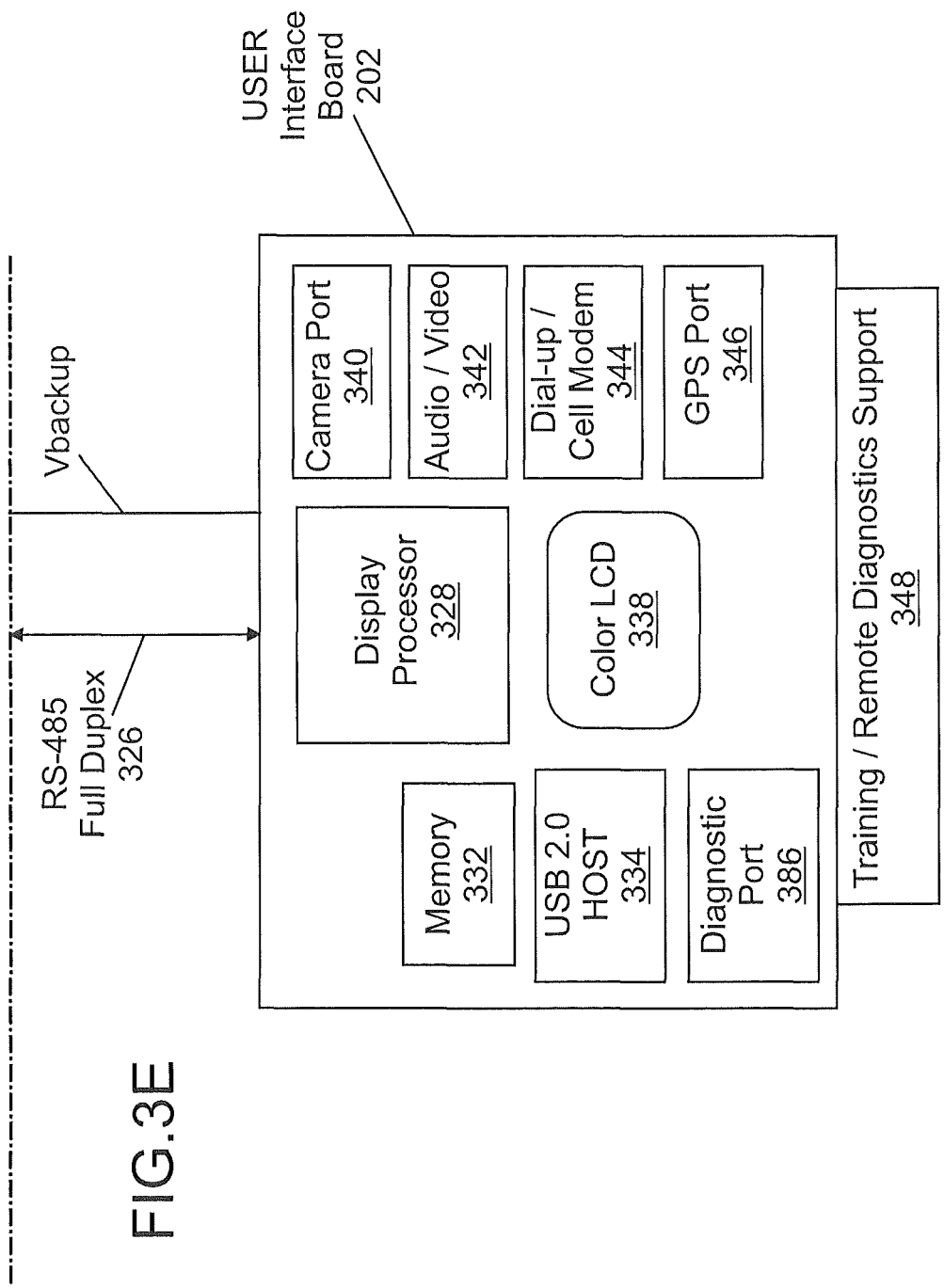

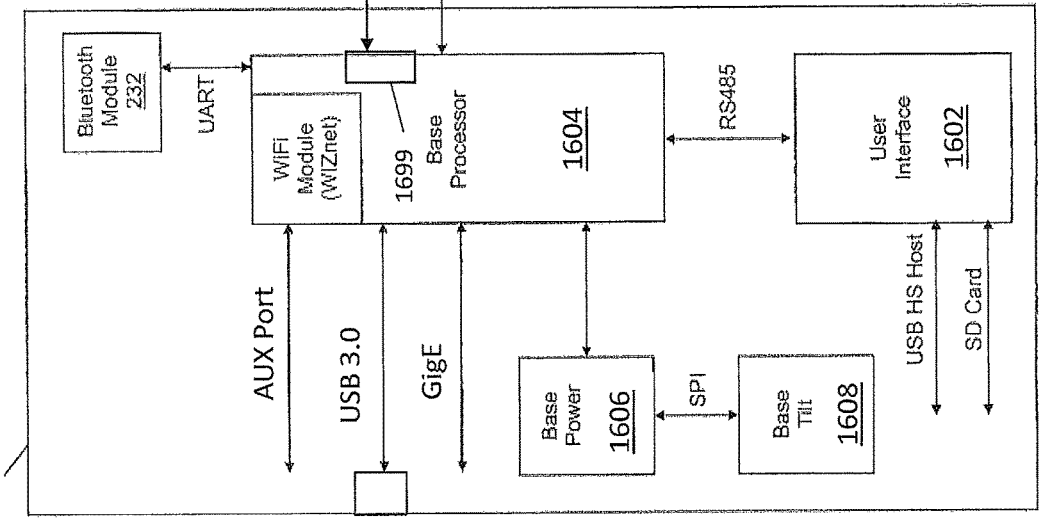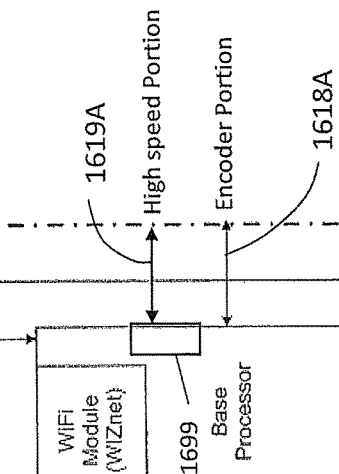

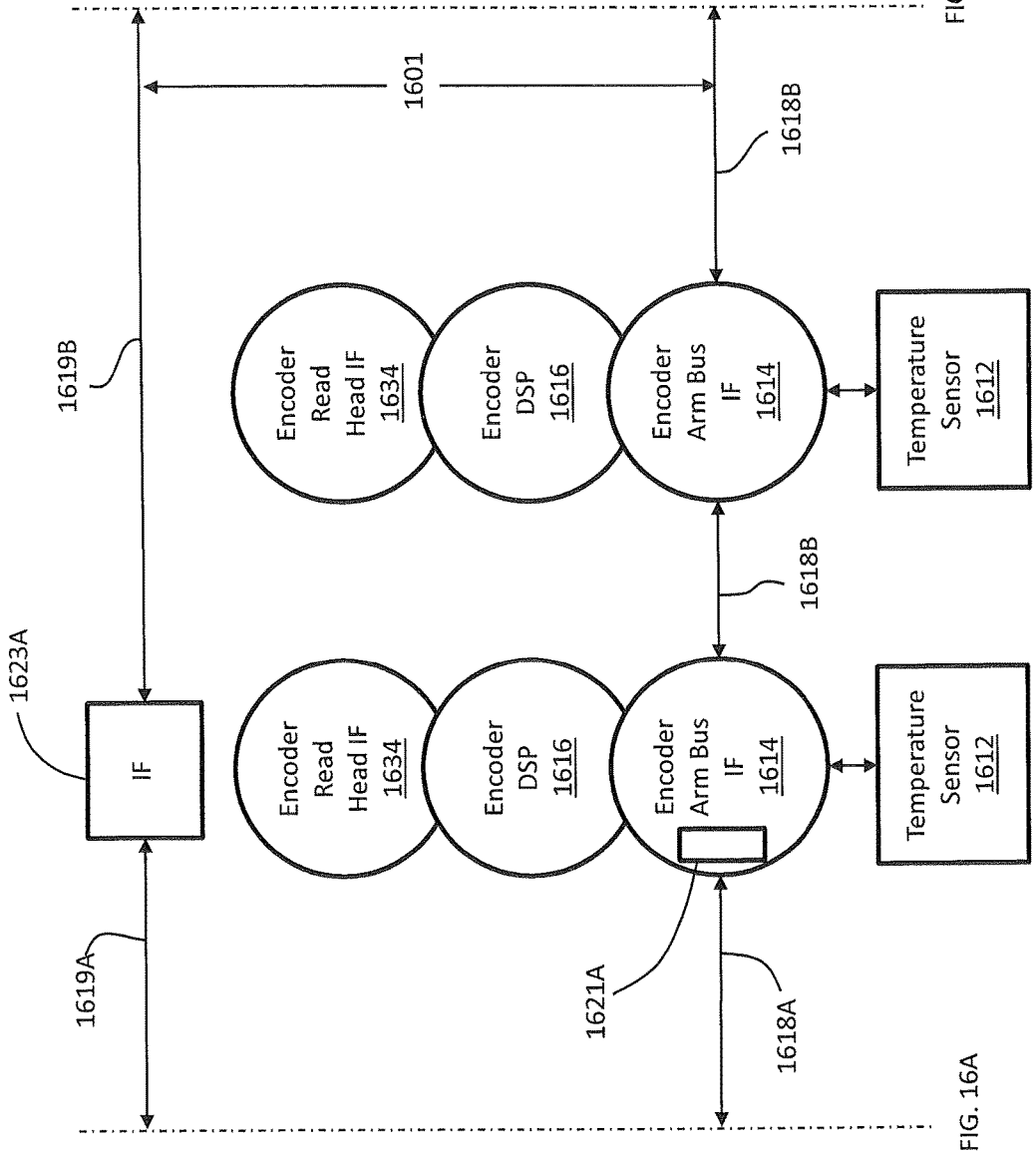

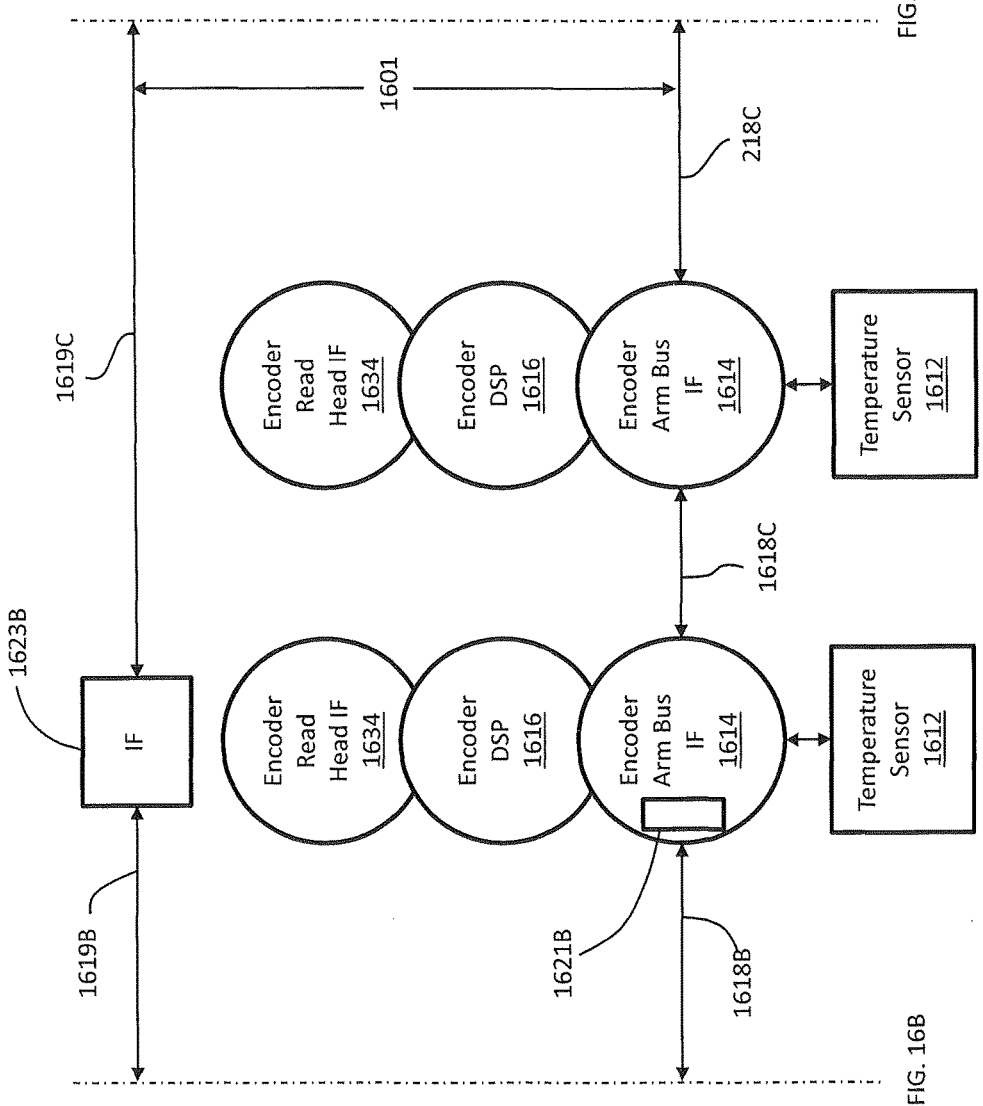

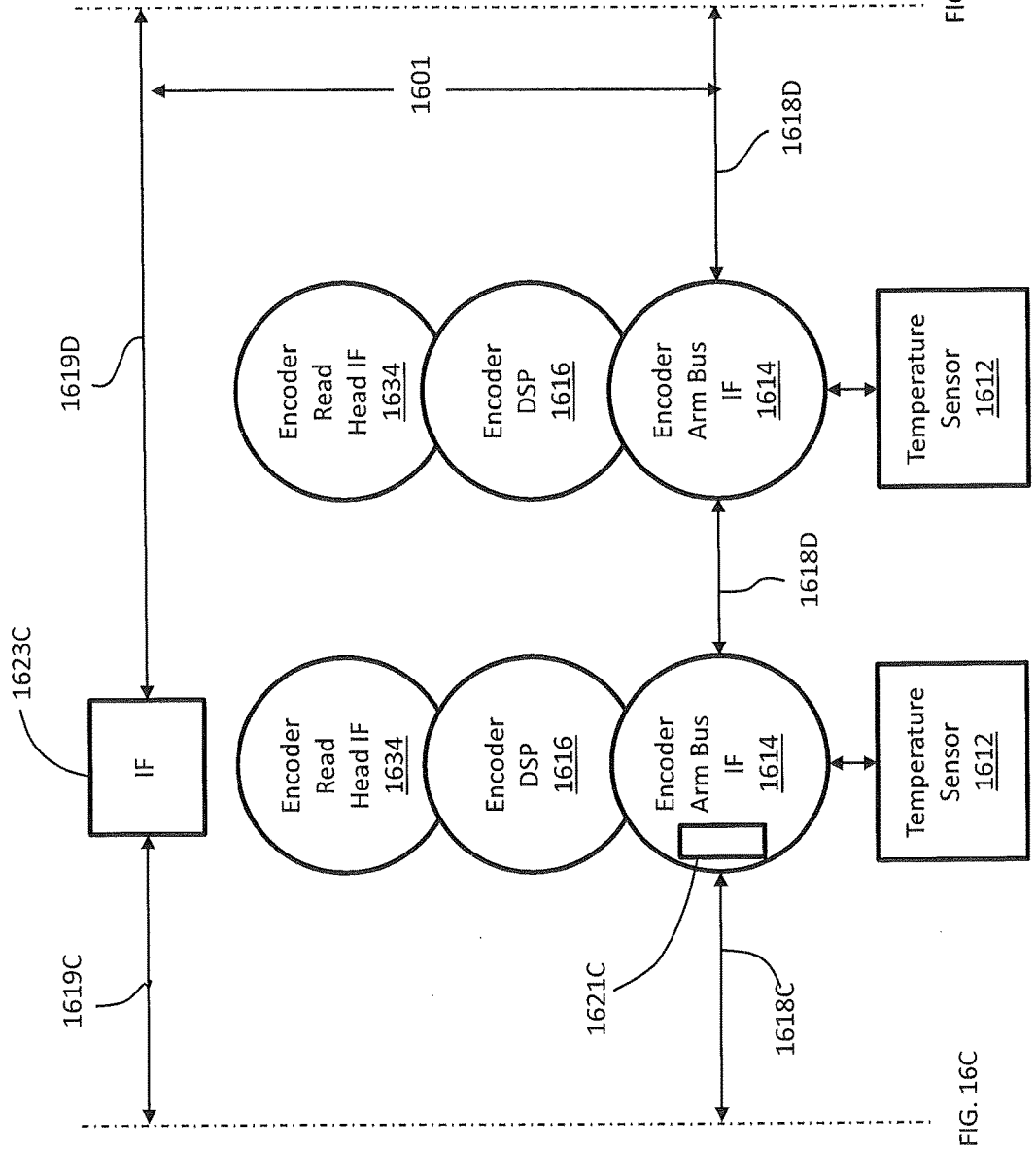

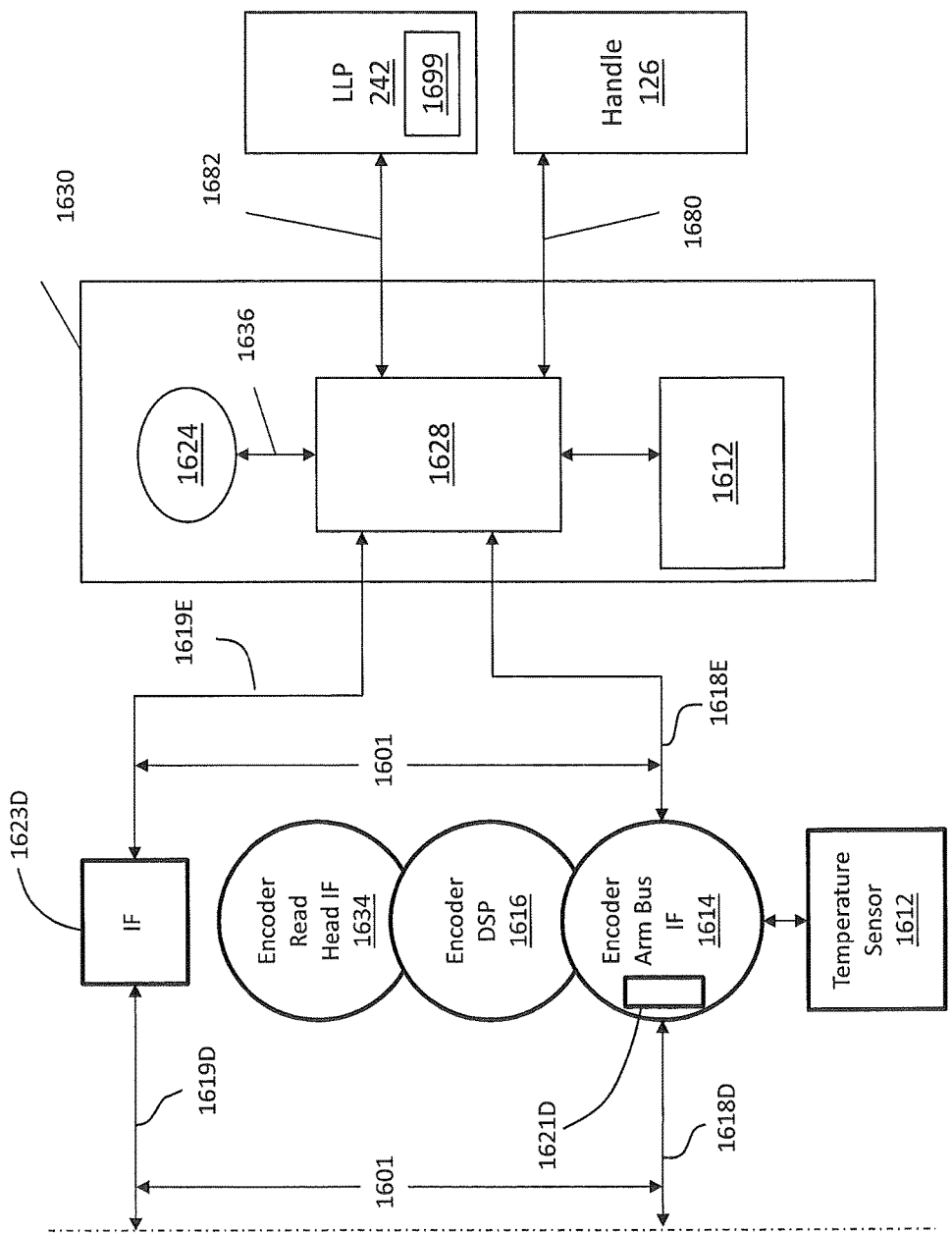

METHOD FOR MEASURING 3D COORDINATES OF A SURFACE WITH A PORTABLE ARTICULATED ARM COORDINATE MEASURING MACHINE HAVING A CAMERA

PRIORITY CLAIM

This application claims priority to U.S. Patent Application 61/840,180 entitled METHOD FOR MEASURING 3D COORDINATES OF A SURFACE WITH A PORTABLE ARTICULATED ARM COORDINATE MEASURING MACHINE HAVING A CAMERA, filed Jun. 27, 2013 and which is incorporates by reference herein.

BACKGROUND

The present disclosure relates to a method for measuring three-dimensional coordinates of an object surface by obtaining multiple two-dimensional (2D) images with camera attached to an articulated arm coordinate measurement machine (CMM).

Portable articulated arm coordinate measuring machines (AACMMs) have found widespread use in the manufacturing or production of parts where there is a need to rapidly and accurately verify the dimensions of the part during various stages of the manufacturing or production (e.g., machining) of the part. Portable AACMMs represent a vast improvement over known stationary or fixed, cost-intensive and relatively difficult to use measurement installations, particularly in the amount of time it takes to perform dimensional measurements of relatively complex parts. Typically, a user of a portable AACMM simply guides a probe along the surface of the part or object to be measured. The measurement data are then recorded and provided to the user. In some cases, the data are provided to the user in visual form, for example, three-dimensional (3-D) form on a computer screen. In other cases, the data are provided to the user in numeric form, for example when measuring the diameter of a hole, the text "Diameter=1.0034" is displayed on a computer screen.

An example of a prior art portable articulated arm CMM is disclosed in commonly assigned U.S. Pat. No. 5,402,582 ('582), which is incorporated herein by reference in its entirety. The '582 patent discloses a 3-D measuring system comprised of a manually-operated articulated arm CMM having a support base on one end and a measurement probe at the other end. Commonly assigned U.S. Pat. No. 5,611, 147 ('147), which is incorporated herein by reference in its entirety, discloses a similar articulated arm CMM. In the '147 patent, the articulated arm CMM includes a number of features including an additional rotational axis at the probe end, thereby providing for an arm with either a two-two-two or a two-two-three axis configuration (the latter case being a seven axis arm).

It is desirable to obtain accurate 3D representations of surfaces, especially representations that include color, pattern, and textures. What is needed is an articulated arm CMM that includes a relatively low cost measurement device providing this capability.

SUMMARY OF THE INVENTION

According to one embodiment, a method for measuring three-dimensional (3D) coordinates of a surface is disclosed. The method includes providing a base and providing a manually positionable articulated arm portion having opposed first and second ends. In this embodiment, the arm portion is rotationally coupled to the base at the second end and includes a plurality of connected arm segments that each include at least one angle transducer for producing an angle signal. The method also includes providing a measurement device coupled to the first end and that includes a camera having a lens and a photosensitive array, providing an electronic circuit configured to receive the angle signal from the at least one angle transducer and to provide data corresponding to a position and an orientation of the measurement device and providing a processor. The method further includes moving by an operator the camera to a first position and a first orientation, sending to the processor from the electronic circuit first data corresponding to the first position and the first orientation, forming with the lens a first image of the surface on the photosensitive array, and sending a first digital signal to the processor in response. The method also includes moving by the operator the camera to a second position and a second orientation, sending to the processor from the electronic circuit second data corresponding to the second position and the second orientation, forming with the lens a second image of the surface on the photosensitive array, and sending a second digital signal to the processor in response. In this embodiment, the method further includes finding with the processor a first set of cardinal points common to the first image and the second image based at least in part on the first digital signal and the second digital signal, finding with the processor a first set of locations on the photosensitive array and a second set of locations on the photosensitive array, the first set of locations corresponding to the first set of cardinal points in the first image and the second set of locations corresponding to the first set of cardinal points in the second image, calculating a first set of 3D coordinates for the first set of cardinal points, the first set of 3D coordinates including 3D coordinates for each cardinal point of the first set of cardinal points, wherein the 3D coordinates for each cardinal point of the first set of cardinal points is based at least in part on the first data, the first set of locations, the second data, and the second set of locations, and saving the first 3D coordinates.

BRIEF DESCRIPTION OF THE DRAWINGS

Referring now to the drawings, exemplary embodiments are shown which should not be construed to be limiting regarding the entire scope of the disclosure, and wherein the elements are numbered alike in several FIGURES:

FIGS. 16A-16E show block diagrams of electronics utilized as part of the AACMM of FIG. 1 in accordance with another embodiment;

DETAILED DESCRIPTION

An embodiment of the present invention provides an articulated arm CMM having a camera attached as a measurement device for obtaining 3D coordinates of an object surface.

Figure 1A:
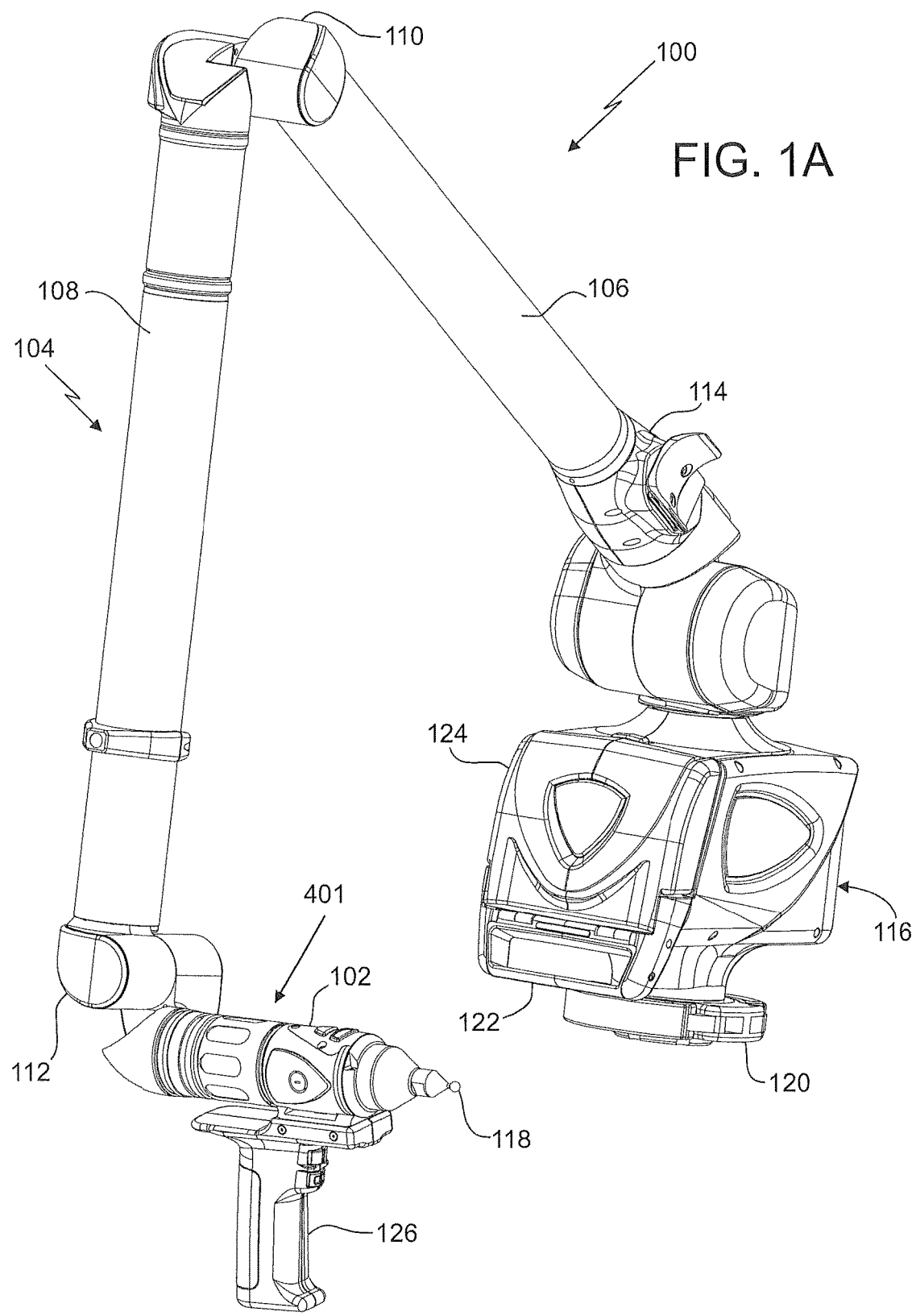
FIGS. 1A and 1B, are perspective views of a portable articulated arm coordinate measuring machine (AACMM) having embodiments of various aspects of the present invention therewithin.
Figure 1B:
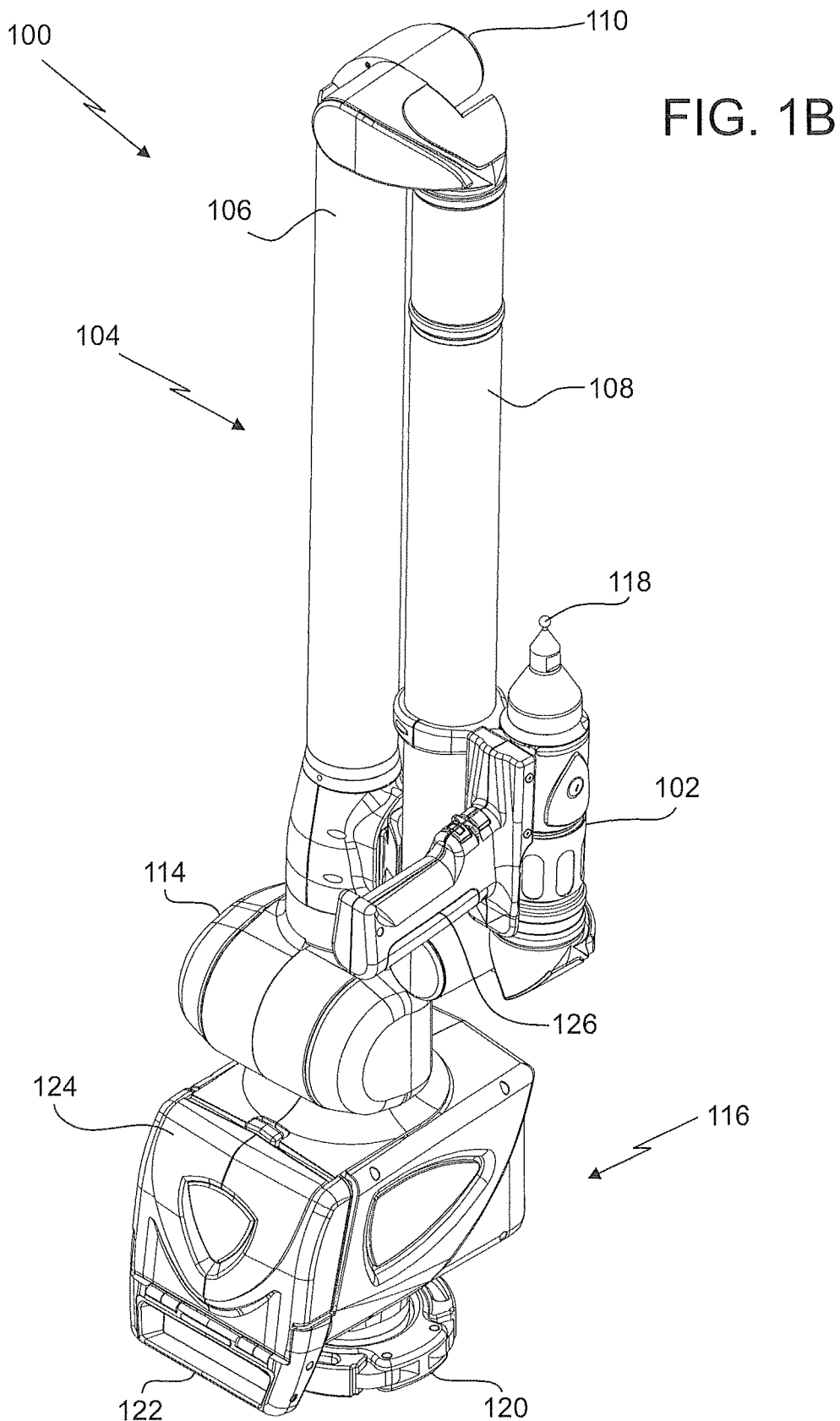

FIGS. 1A and 1B illustrate, in perspective, an AACMM 100 according to various embodiments of the present invention implemented as an articulated arm. Of course, the AACMM could take other forms. As shown in FIGS. 1A and 1B, the exemplary AACMM 100 may comprise a six or seven axis articulated measurement device having a probe end 401 that includes a measurement probe housing 102 coupled to an arm portion 104 of the AACMM 100 at one end. The arm portion 104 comprises a first arm segment 106 coupled to a second arm segment 108 by a rotational connection having a first grouping of bearing cartridges 110 (e.g., two bearing cartridges). A second grouping of bearing cartridges 112 (e.g., two bearing cartridges) couples the second arm segment 108 to the measurement probe housing 102. A third grouping of bearing cartridges 114 (e.g., three bearing cartridges) couples the first arm segment 106 to a base 116 located at the other end of the arm portion 104 of the AACMM 100. Each grouping of bearing cartridges 110, 112, 114 may allow for multiple axes of articulated movement. Also, the probe end 401 may include a measurement probe housing 102 that comprises the shaft of the seventh axis portion of the AACMM 100 (e.g., a cartridge containing an encoder system that determines movement of the measurement device, for example a contact probe 118, in the seventh axis of the AACMM 100). In this embodiment, the probe end 401 may rotate about an axis extending through the center of measurement probe housing 102. In use of the AACMM 100, the base 116 is typically affixed to a work surface.

Each bearing cartridge within each bearing cartridge grouping 110, 112, 114 typically contains an encoder system (e.g., an optical angular encoder system). The encoder system (i.e., transducer) provides an indication of the position of the respective arm segments 106, 108 and corresponding bearing cartridge groupings 110, 112, 114 that all together provide an indication of the position of the probe 118 with respect to the base 116 (and, thus, the position of the object being measured by the AACMM 100 in a certain frame of reference—for example a local or global frame of reference). The arm segments 106, 108 may be made from a suitably rigid material such as but not limited to a carbon composite material for example. A portable AACMM 100 with six or seven axes of articulated movement (i.e., degrees of freedom) provides advantages in allowing the operator to position the probe 118 in a desired location within a 360° area about the base 116 while providing an arm portion 104 that may be easily handled by the operator. However, it should be appreciated that the illustration of an arm portion 104 having two arm segments 106, 108 is for exemplary purposes, and the claimed invention should not be so limited. An AACMM 100 may have any number of arm segments coupled together by bearing cartridges (and, thus, more or less than six or seven axes of articulated movement or degrees of freedom).

Figure 10:
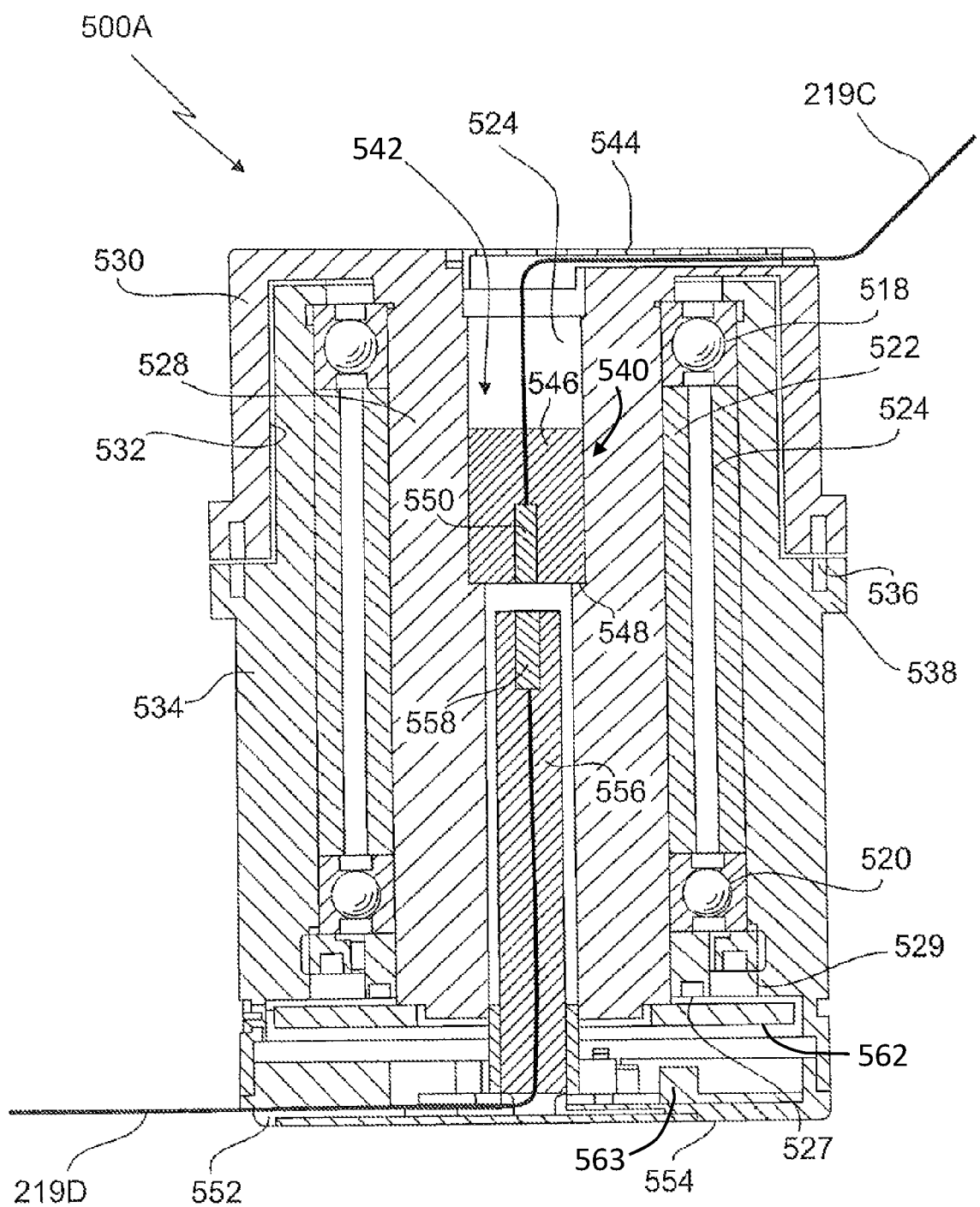
FIG. 10 is a sectional view of a cartridge of FIG. 9 with an optical rotary joint in accordance with an embodiment.
Figure 11:
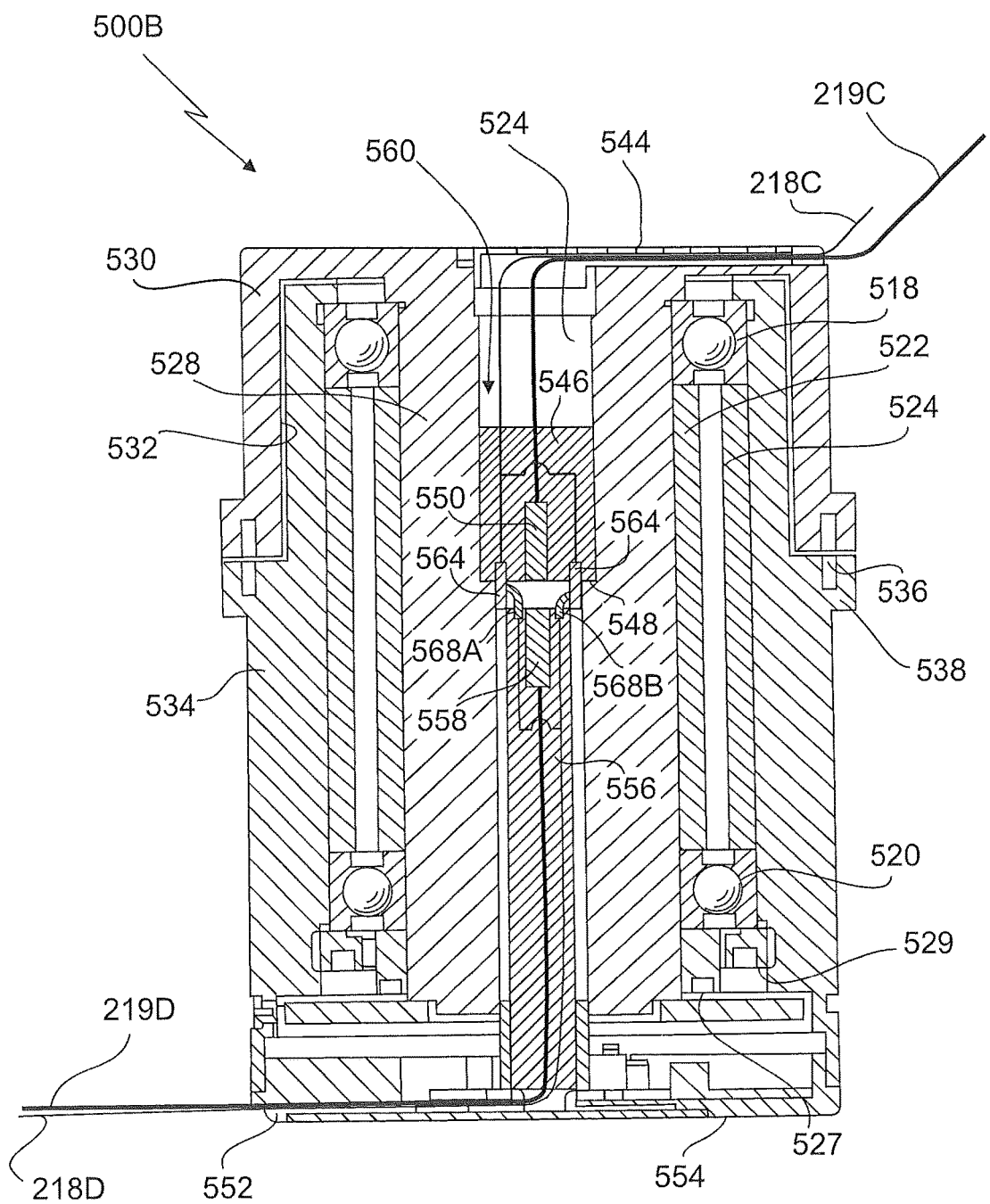
FIG. 11 is a sectional view of a cartridge of FIG. 9 with an integrated fiber-optic and electrical slip ring in accordance with another embodiment.

As will be discussed in more detail below, each of the groupings of bearing cartridges 110, 112, 114 may include one or more optical rotary joint 540 or slip ring 560 (FIG. 10 and FIG. 11). The optical rotary joint 540 or slip ring 560 allows for the transfer of electrical and optical signals along the length of the arm portion 104 while still allowing each of the groupings of bearing cartridges 110, 112, 114 to rotate substantially unencumbered. According to one embodiment, only electrical signals are transmitted. In such an embodiment, the optical rotary joints may be omitted.

The probe 118 is detachably mounted to the measurement probe housing 102, which is connected to bearing cartridge grouping 112. A handle accessory 126 is removable with respect to the measurement probe housing 102 by way of, for example, a quick-connect interface. In the exemplary embodiment, the quick-connect interface may include both mechanical fastening members that secure the accessory to the housing 102 and electrical connections that allow the user to control the probe 118 through the accessory (e.g. actuation buttons) and also provide for high speed data communication between the accessory and the base 116. The handle 126 may be replaced with another device (e.g., a laser line probe, a bar code reader), thereby providing advantages in allowing the operator to use different measurement devices with the same AACMM 100. In exemplary embodiments, the probe housing 102 houses a removable probe 118, which is a contacting measurement device and may have different tips 118 that physically contact the object to be measured, including, but not limited to: ball, touch-sensitive, curved and extension type probes. In other embodiments, the measurement is performed, for example, by a non-contacting device such as a laser line probe (LLP). In an embodiment, the handle 126 is replaced with the LLP using the quick-connect interface. Other types of accessory devices may replace the removable handle 126 to provide additional functionality. Examples of such accessory devices include, but are not limited to, one or more illumination lights, a temperature sensor, a thermal scanner, a bar code scanner, a projector, a paint sprayer, a camera, a video camera, an audio recording system or the like, for example.

As shown in FIGS. 1A and 1B, the AACMM 100 includes the removable handle 126 that provides advantages in allowing accessories or functionality to be changed without removing the measurement probe housing 102 from the bearing cartridge grouping 112. As discussed in more detail below with respect to FIG. 2, the removable handle 126 may also include one or more electrical connectors that allow electrical power and data to be exchanged with the handle 126 and the corresponding electronics located in the probe end 401 and the base 116.

In various embodiments, and as will be discussed in more detail below, each rotational connection includes a grouping of bearing cartridges 110, 112, 114 that allow the arm portion 104 of the AACMM 100 to move about multiple axes of rotation. As mentioned, each bearing cartridge grouping 110, 112, 114 includes corresponding encoder systems, such as optical angular encoders for example, that are each arranged coaxially with the corresponding axis of rotation of, e.g., the arm segments 106, 108. The optical encoder system detects rotational (swivel) or transverse (hinge) movement of, e.g., each one of the arm segments 106, 108 about the corresponding axis and transmits a signal to an electronic data processing system within the AACMM 100 as described in more detail herein below. Each individual raw encoder count is sent separately to the electronic data processing system as a signal where it is further processed into measurement data. No position calculator separate from the AACMM 100 itself (e.g., a serial box) is required, as disclosed in commonly assigned U.S. Pat. No. 5,402,582 ('582).

The base 116 may include an attachment device or mounting device 120. The mounting device 120 allows the AACMM 100 to be removably mounted to a desired location, such as an inspection table, a machining center, a wall or the floor for example. In one embodiment, the base 116 includes a handle portion 122 that provides a convenient location for the operator to hold the base 116 as the AACMM 100 is being moved. In one embodiment, the base 116 further includes a movable cover portion 124 that folds down to reveal a user interface, such as a display screen.

In accordance with an embodiment, the base 116 of the portable AACMM 100 contains or houses an electronic data processing system that includes two primary components: a base processing system that processes the data from the various encoder systems within the AACMM 100 as well as data representing other arm parameters to support three-dimensional (3-D) positional calculations; and a user interface processing system that includes an on-board operating system, a touch screen display, and resident application software that allows for relatively complete metrology functions to be implemented within the AACMM 100 without the need for connection to an external computer.

The electronic data processing system in the base 116 may communicate with the encoder systems, sensors, and other peripheral hardware located away from the base 116 (e.g., a LLP that can be mounted to or within the removable handle 126 on the AACMM 100). The electronics that support these peripheral hardware devices or features may be located in each of the bearing cartridge groupings 110, 112, 114 located within the portable AACMM 100.

Figure 2A:
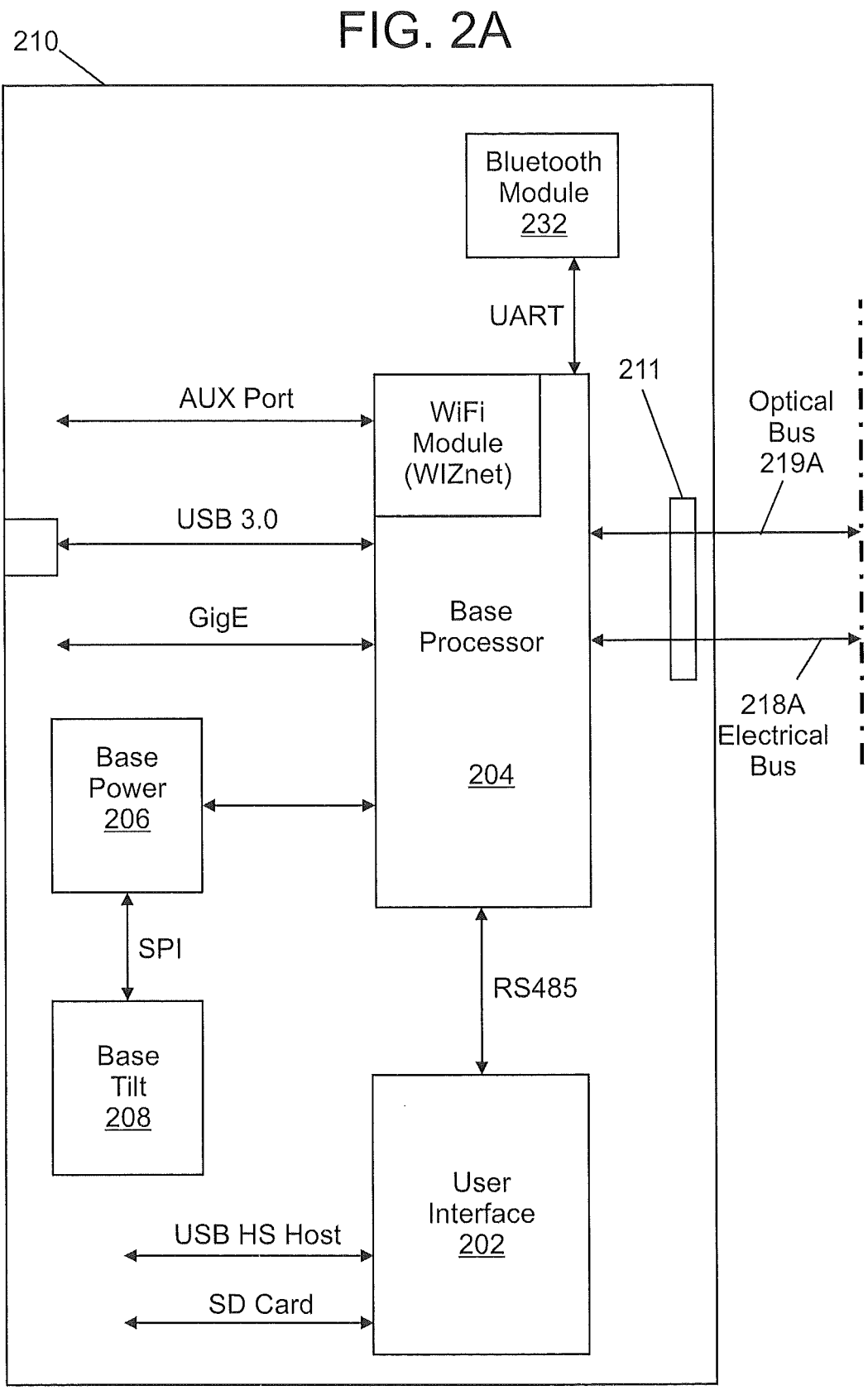
FIG. 2, including FIGS. 2A-2E taken together, is a block diagram of electronics utilized as part of the AACMM of FIG. 1 in accordance with an embodiment.
Figure 2E:
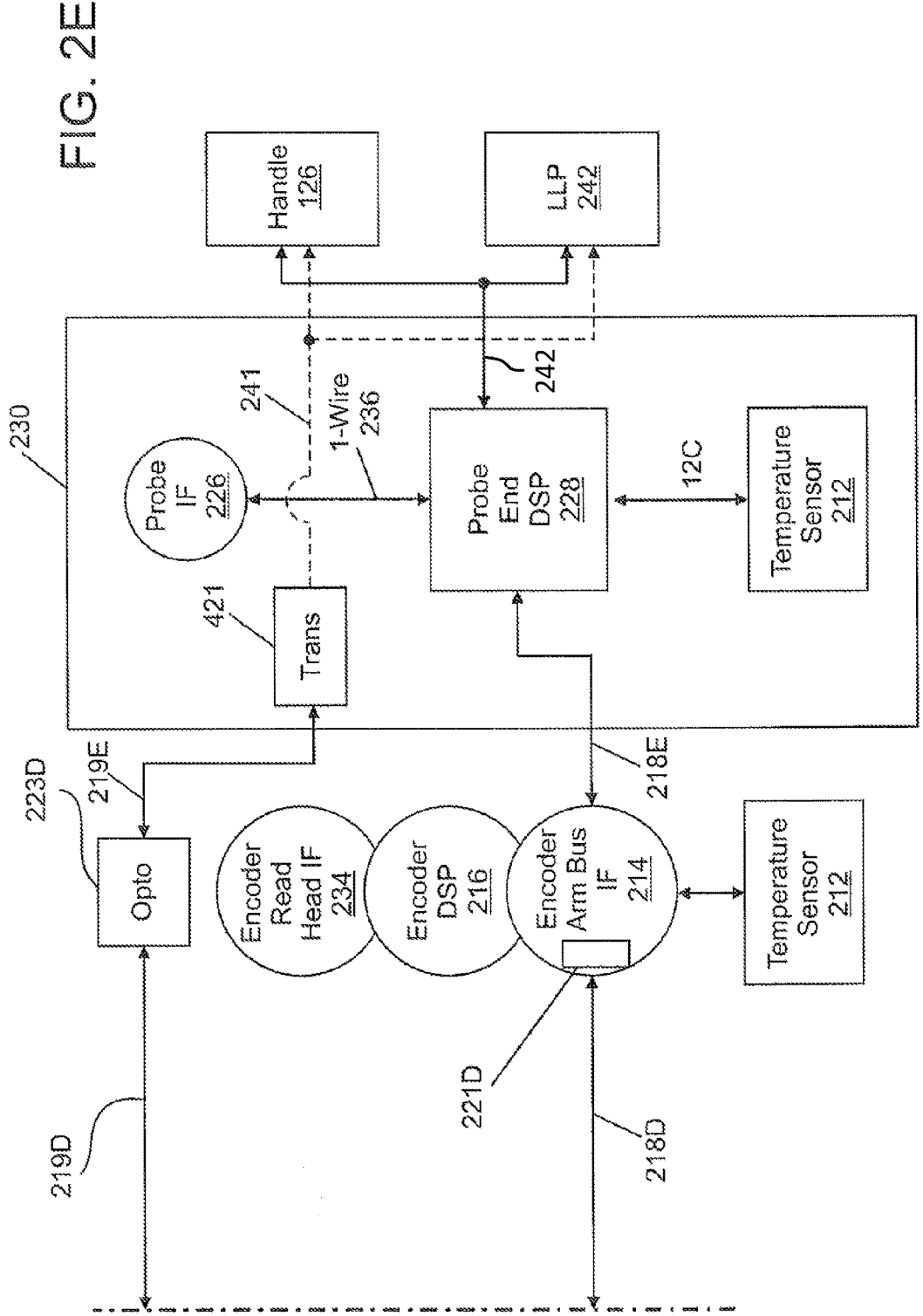

FIG. 2 is a block diagram of electronics utilized in an AACMM 100 in accordance with an embodiment and includes reference to FIGS. 2A-2E. The embodiment shown in FIG. 2A includes an electronic data processing system 210 including a base processor board 204 for implementing the base processing system, a user interface board 202, a base power board 206 for providing power, a BLUETOOTH wireless communication module 232, and a base tilt board 208. The user interface board 202 includes a computer processor for executing application software to perform user interface, display, and other functions described herein.

As shown in FIG. 2A-2D, the electronic data processing system 210 is in communication with the aforementioned plurality of encoder systems via one or more electrical buses 218A, 218B, 218C, 218D. It should be appreciated that the data processing system 210 may include additional components, such as connector 211, for example, that are configured to adapt the incoming and outgoing signals to an optical bus 219A-219D and an electrical bus 218A-218D. The conversion between optical and electrical signals may be carried out by a component configured to convert between electrical and optical signals, for example, on a circuit board associated with FIG. 2A. For the clarity purposes, not all of these components are shown in FIG. 2. In the embodiment depicted in FIG. 2, each encoder system generates encoder data and includes: an encoder bus interface 214, an encoder digital signal processor (DSP) 216, an encoder read head interface (IF) 234, and a temperature sensor 212. Other devices, such as strain sensors, may be attached to the electrical bus 218 or to optical bus 219. While illustrated in many of the following figures, it shall be understood that the optical bus 219A-219D may be omitted in the event that the data carried thereon is carried on the electrical bus 218 instead.

Also shown in FIG. 2E are probe end electronics 230 that are in communication with the electrical bus 218E and optical bus 219E. The probe end electronics 230 include a probe end DSP 228, a temperature sensor 212, a handle/laser-line-probe (LLP) electrical bus 240 and a bus 241 that connects with the handle 126 or the LLP 242 via the quick-connect interface in an embodiment, and a probe interface 226. The bus 241 may be an electrical bus, an optical bus, or a bus that includes both optical and electrical signals. The quick-connect interface allows access by the handle 126 to the electrical bus 240 and bus 241 for the LLP and other accessories. The electrical bus may contain data lines, control lines, and power lines. The optical bus 219 may contain data lines and control lines. In an embodiment, the probe end electronics 230 are located in the measurement probe housing 102 on the AACMM 100. In an embodiment, the handle 126 may be removed from the quick-connect interface and measurement may be performed by the laser line probe 242 communicating with the probe end electronics 230 of the AACMM 100 via the handle/LLP electrical bus 240 or optical bus 241. It should be appreciated that while the electrical bus 218 and optical bus 219 are discussed as individual components, each of the busses 218, 219 may be formed from a plurality of individual bus segments (e.g. bus 218A-218E, bus 219A-219E) that are serially connected to transfer signals within the AACMM 100. As is discussed in more detail herein, each segment may be separated by a rotary coupler (FIG. 10 and FIG. 11) having an electrical slip ring 221A-221D and an optical coupler 223A-223D. In another embodiment, the LLP 242 may communicate with the probe end DSP 228 only and the bus 241 and optical bus 219 could be omitted.

In an embodiment, the electronic data processing system 210 is located in the base 116 of the AACMM 100, the probe end electronics 230 are located in the measurement probe housing 102 of the AACMM 100, and the encoder systems are located in the bearing cartridge groupings 110, 112, 114. The probe interface 226 may connect with the probe end DSP 228 by any suitable communications protocol, including commercially-available products from Maxim Integrated Products, Inc. that embody the 1-wire(r) communications protocol 236. The optical bus 219 may be selected to be compatible with a standard communications protocol such as Universal Serial Bus (USB) 1.0, USB 2.0, USB 3.0, Gigabit Ethernet (IEEE 802.3-2008 standard), Peripheral Component Interconnect (PCI) Express, FireWire, Camera Link or any other defined protocols. In one embodiment, the optical bus is omitted and electrical signals are carried along the bus 218 from the LLP 242 according to any of the above discussed or later developed communication protocols. Such an embodiment is more fully described below.

Figure 3:
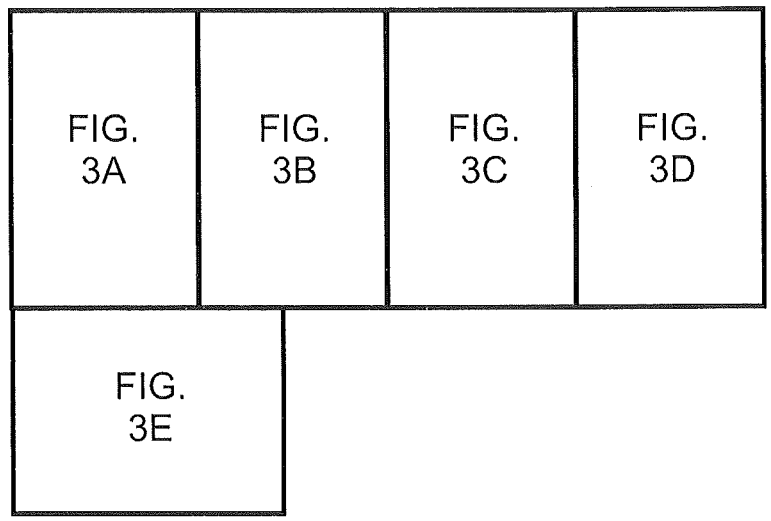
FIG. 3, including FIGS. 3A-3E taken together, is a block diagram describing detailed features of the electronic data processing system of FIG. 2 in accordance with an embodiment.
Figure 3A:
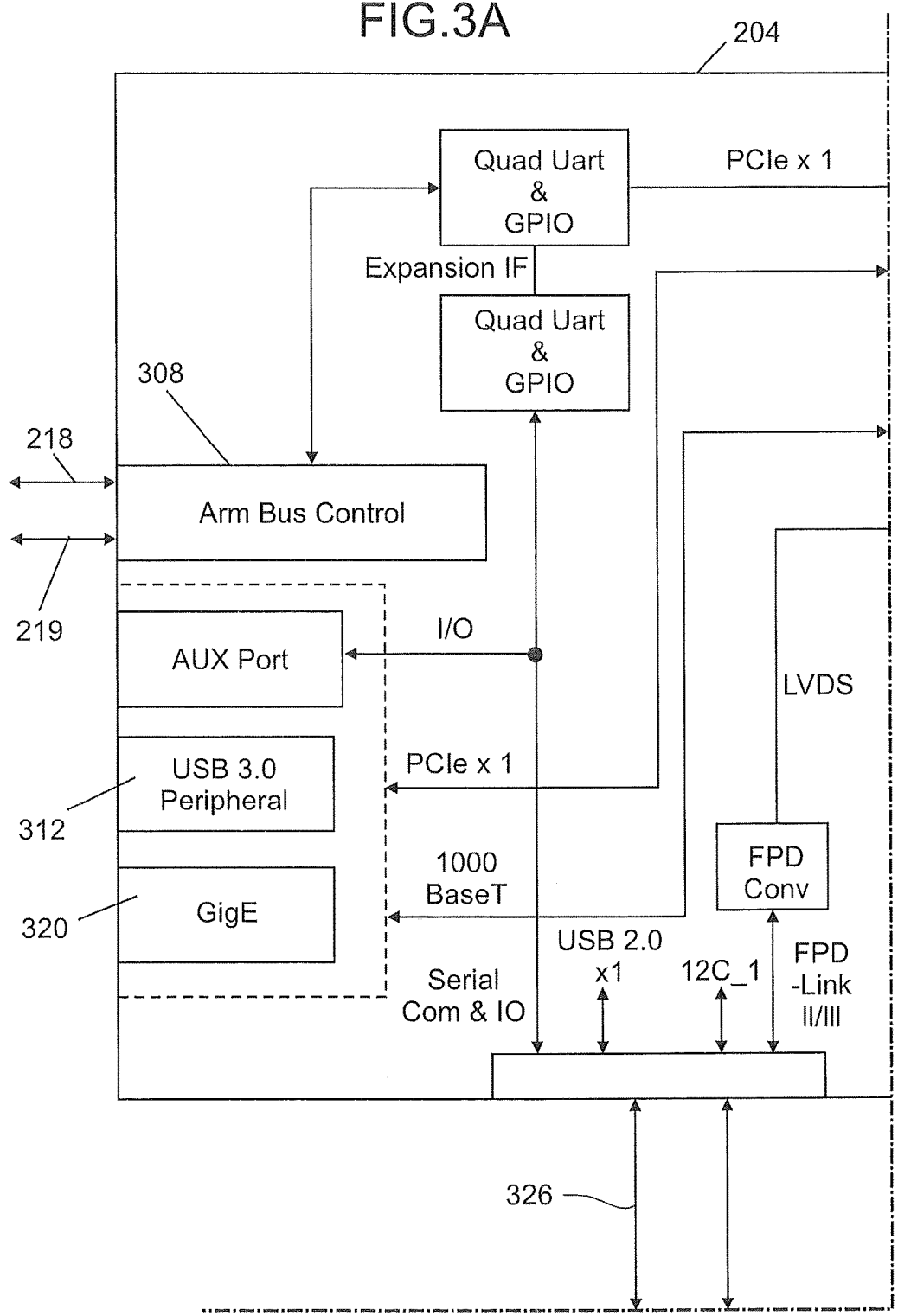

FIGS. 3A-3C are block diagrams describing detailed features of the electronic data processing system 210 (FIG. 2A) of the AACMM 100 in accordance with an embodiment. In an embodiment, the electronic data processing system 210 is located in the base 116 of the AACMM 100 and includes the base processor board 204, the user interface board 202, a base power board 206, a BLUETOOTH wireless communication module 232, and a base tilt module 208.

In an embodiment shown in FIGS. 3A-3C, the base processor board 204 includes the various functional blocks illustrated therein. For example, a base processor function 302 is utilized to support the collection of measurement data from the AACMM 100 and receives raw arm data (e.g., encoder system data) via the electrical bus 218, optical bus 219 and a bus control module function 308. The memory function 304 stores programs and static AACMM configuration data. The base processor board 204 also includes an external hardware option port function 310 for communicating with any external hardware devices or accessories such as but not limited to a graphical monitor or television via HDMI port 311, an audio device via port 313, a USB 3.0 port 315 and a flash memory (SD) card via port 317 for example. A real time clock (RTC) and log 306, a battery pack interface (IF) 316, and a diagnostic port 318 are also included in the functionality in an embodiment of the base processor board 204 depicted in FIG. 3.

The base processor board 204 also manages all the wired and wireless data communication with external (host computer) and internal (display processor 328) devices. The base processor board 204 has the capability of communicating with an Ethernet network via a gigabit Ethernet function 320 (e.g., using a clock synchronization standard such as Institute of Electrical and Electronics Engineers (IEEE) 1588), with a wireless local area network (WLAN) via a LAN function 322, and with BLUETOOTH wireless communication 232 via a parallel to serial communications (PSC) function 314. The base processor board 204 also includes a connection to a universal serial bus (USB 3.0) device 312.

The base processor board 204 transmits and collects raw measurement data (e.g., encoder system counts, temperature readings) for processing into measurement data without the need for any preprocessing, such as in the serial box disclosed in the aforementioned '582 patent. The base processor 204 sends the processed data to the display processor 328 on the user interface board 202 via an RS485 interface (IF) 326. In an embodiment, the base processor 204 also sends the raw measurement data to an external computer.

Turning now to the user interface board 202 in FIG. 3, the angle and positional data received by the base processor is utilized by applications executing on the display processor 328 to provide an autonomous metrology system within the AACMM 100. Applications may be executed on the display processor 328 to support functions such as, but not limited to: measurement of features, guidance and training graphics, remote diagnostics, temperature corrections, control of various operational features, connection to various networks, and display of measured objects. Along with the display processor 328 and a liquid crystal display (LCD) 338 (e.g., a touch screen LCD) user interface, the user interface board 202 includes several interface options including a memory 332, a USB Host interface 334, a diagnostic port 386, a camera port 340, an audio/video interface 342, a dial-up/ cell modem 344 and a global positioning system (GPS) port 346.

The electronic data processing system 210 shown in FIG. 3 also includes a base power board 206 with an environmental recorder 362 for recording environmental data. The base power board 206 also provides power to the electronic data processing system 210 using an AC/DC converter 358 and a battery charger control 360. The base power board 206 communicates with the base processor board 204 using inter-integrated circuit (I2C) serial single ended bus 354 as well as via a DMA serial peripheral interface (DSPI) 357. The base power board 206 is connected to a tilt sensor and radio frequency identification (RFID) module 208 via an input/output (I/O) expansion function 364 implemented in the base power board 206.

Though shown as separate components, in other embodiments all or a subset of the components may be physically located in different locations and/or functions combined in different manners than that shown in FIG. 3. For example, in one embodiment, the base processor board 204 and the user interface board 202 are combined into one physical board.

Figure 4:
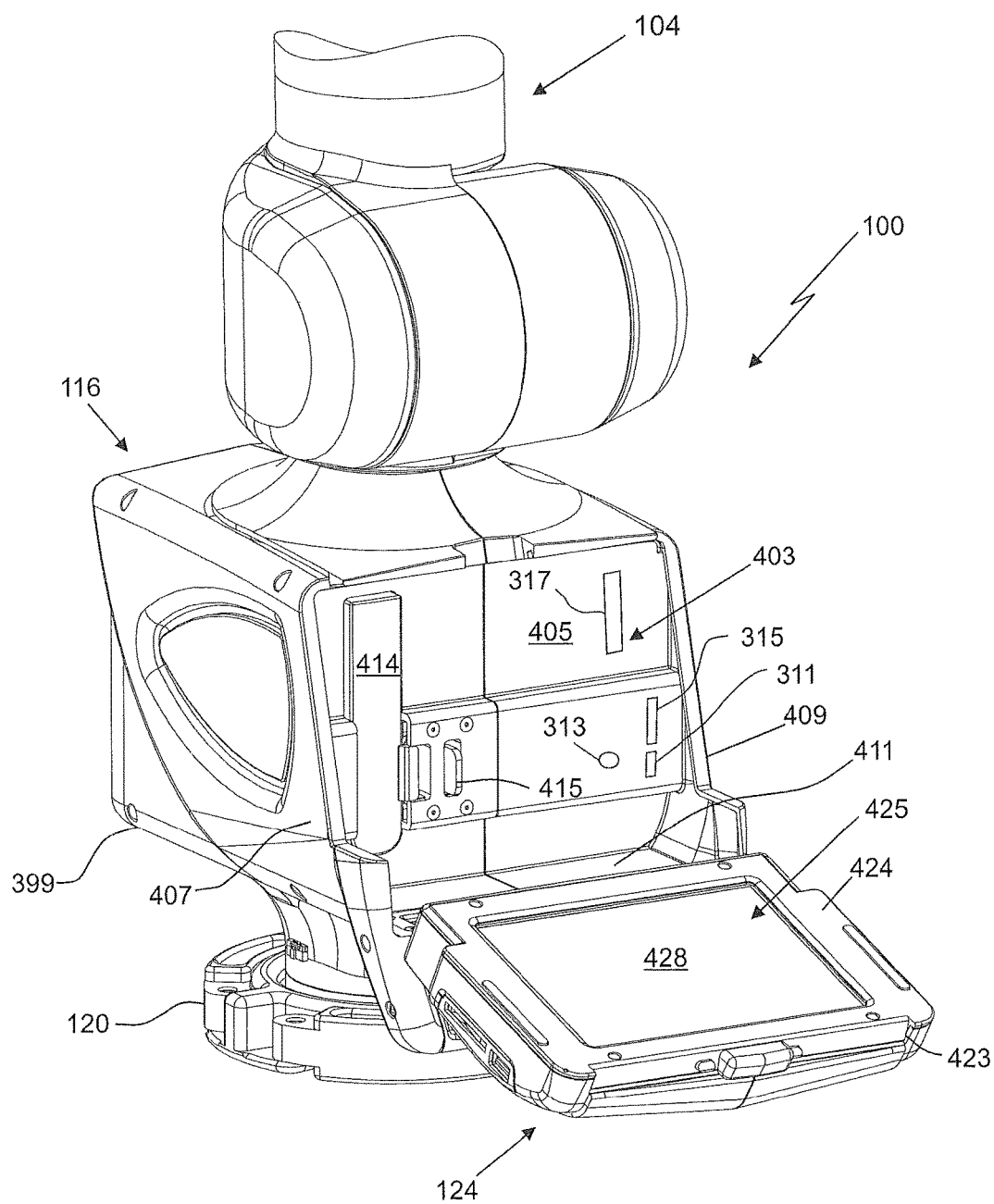
FIG. 4 is a perspective view of the AACMM of FIGS. 1A and 1B.
Figure 5:
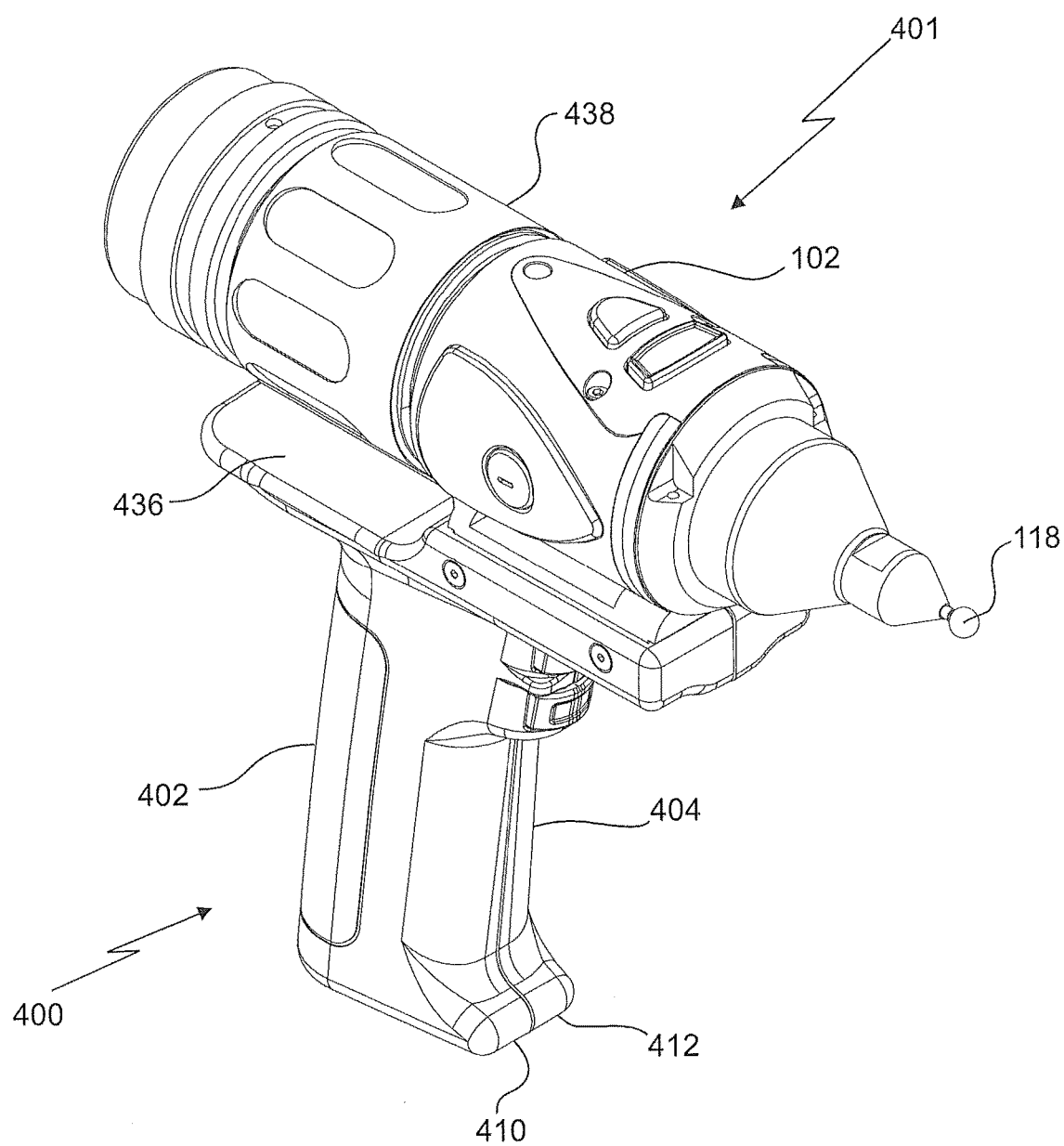
FIG. 5 is a perspective view of the probe end of the AACMM of FIGS. 1A and 1B with a handle accessory being coupled thereto.

Referring now to FIGS. 1 and 4, an embodiment is shown of the AACMM 100 having an integrated display. The AACMM 100 includes a base 116 that includes the electronic data processing system 210 that is arranged to communicate with the optical bus 219 and via one or more electrical busses 218. Data carried by the optical bus 219 or electrical bus 218 may come from encoders associated with the bearing cartridge groups 110, 112, 114 or from arm accessories, or both. The base 116 includes a housing 399 with the mounting device 120 on one end and the bearing cartridge grouping 114 and arm portion 104 on an opposite end. On one side, the housing 399 includes a recess 403. The recess is defined by an interior wall 405, a first side wall 407, a second side wall 409 and an end wall 411. The side walls 407, 409 are arranged on an angle relative to the mounting plane of the AACMM 100 such that the recess 403 tapers from the end adjacent the mounting device 120 to the end adjacent the arm portion 104. Adjacent the end wall 411, the housing 399 includes a handle portion 122 that is sized to facilitate the carrying of the AACMM 100 by the operator.

In one embodiment, the recess 403 includes an opening sized to receive a battery 414. The battery 414 is removably disposed in the housing 399 and is secured by a latch 415 that is movably disposed in wall 405. The latch 415 may include a tab portion that engages a surface of the battery 414 and prevents inadvertent removal. The battery 414 may be coupled to a battery pack interface and provide electrical power to the AACMM 100 when the AACMM 100 is not connected to an external power source (e.g. a wall outlet). In the exemplary embodiment, the battery 414 includes circuitry that communicates with the electronic data processing system 210 and transmits signals that may include, but are not limited to: battery charge level; battery type; model number; manufacturer; characteristics; discharge rate; predicted remaining capacity; temperature; voltage; and an almost-discharged alarm so that the AACMM can shut down in a controlled manner.

Also disposed on wall 405 may be one or more external ports that are coupled to electronic data processing system 210, such as flash memory card port 317, USB 3.0 port 315, HDMI port 311 and audio port 313 for example. The external ports are arranged to be accessible to the user when the movable cover portion 124 is moved from a closed position (FIG. 1) to an open position (FIG. 4).

The movable cover portion 124 includes a housing member 423 that is mounted to hinges that couple the movable cover portion 124 to the end wall 411. In the exemplary embodiment, when in the open position, the movable cover portion 124 is arranged at an obtuse angle relative to the interior wall 405. It should be appreciated that the movable cover portion 124 is continuously rotatable and that the open position may be any position at which the operator can access and utilize the display screen.

The movable cover portion 124 further includes a face member 424 disposed on one side and coupled to the housing member 423. The face member 424 includes an opening 425 sized to allow the viewing of a display 428. The housing member 423 and face member 424 are generally thin wall structures, formed from an injection molded plastic material for example, that define a hollow interior portion. In one embodiment, the housing member 423 or face member 424 may be formed from other materials, including but not limited to steel or aluminum sheet metal for example.

Arranged within the movable cover portion 124 is a display 428 mounted to the face member 424. The display 428 provides a user interface that allows the operator to interact and operate the AACMM 100 without utilizing or connecting an external host computer. The display 428 may include a touch sensitive screen having elements for detecting the touch that include, but are not limited to: resistive elements; surface acoustic wave elements; capacitive elements; surface capacitance elements; projected capacitance elements; infrared photodetector elements; strain gauge elements; optical imaging elements; dispersive signal elements; or acoustic pulse recognition elements. The display 428 is arranged in bidirectional communication with the user interface board 202 and the base processor board 204 such that actuation of the display 428 by the operator may result in one or more signals being transmitted to or from the display 428. In one embodiment, the display 428 is configured to display data, such as high definition video images transmitted via optical bus 219.

Figure 6:
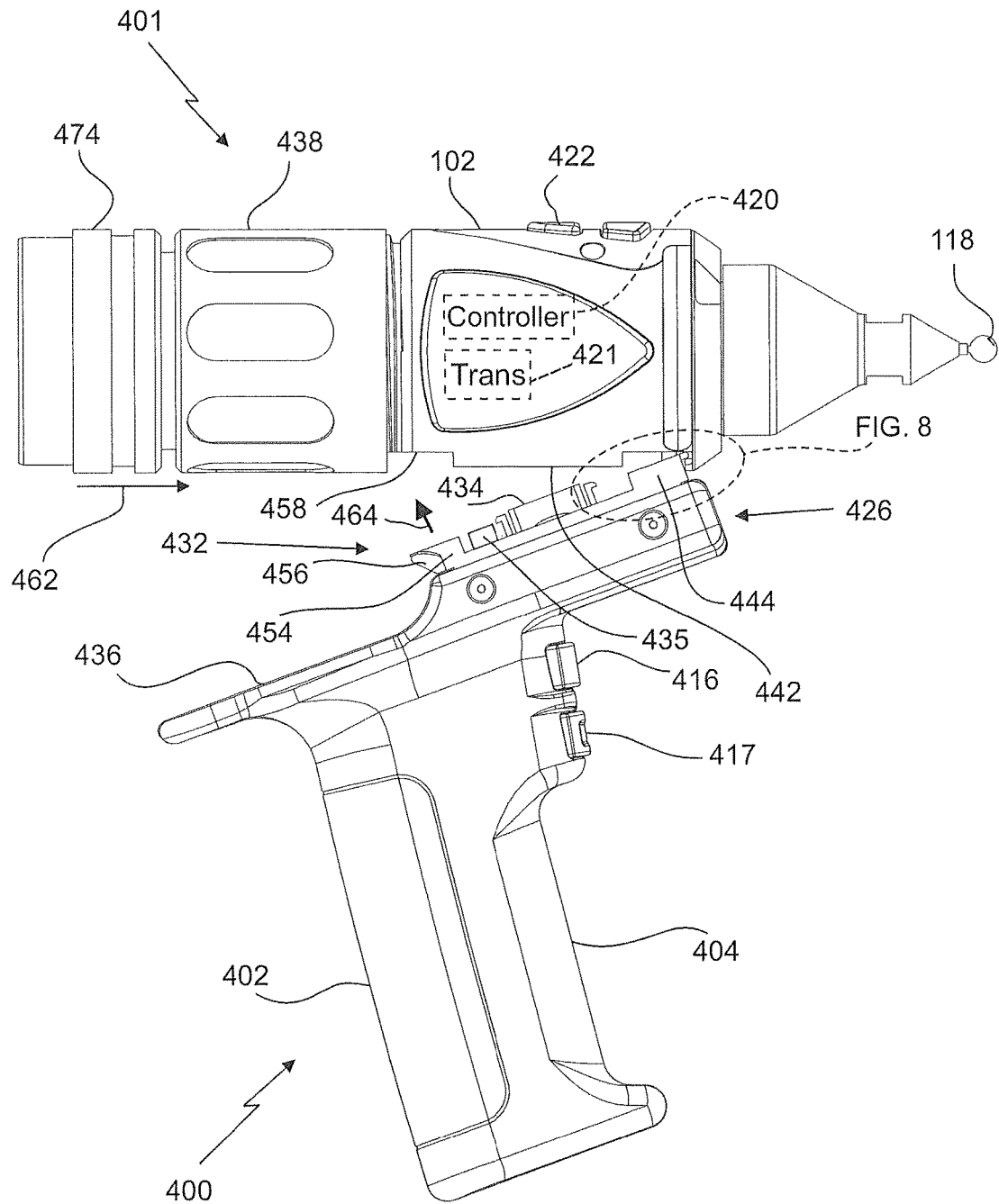
FIG. 6 is a side view of the probe end of FIG. 5 with the handle accessory being partially attached.
Figure 7:
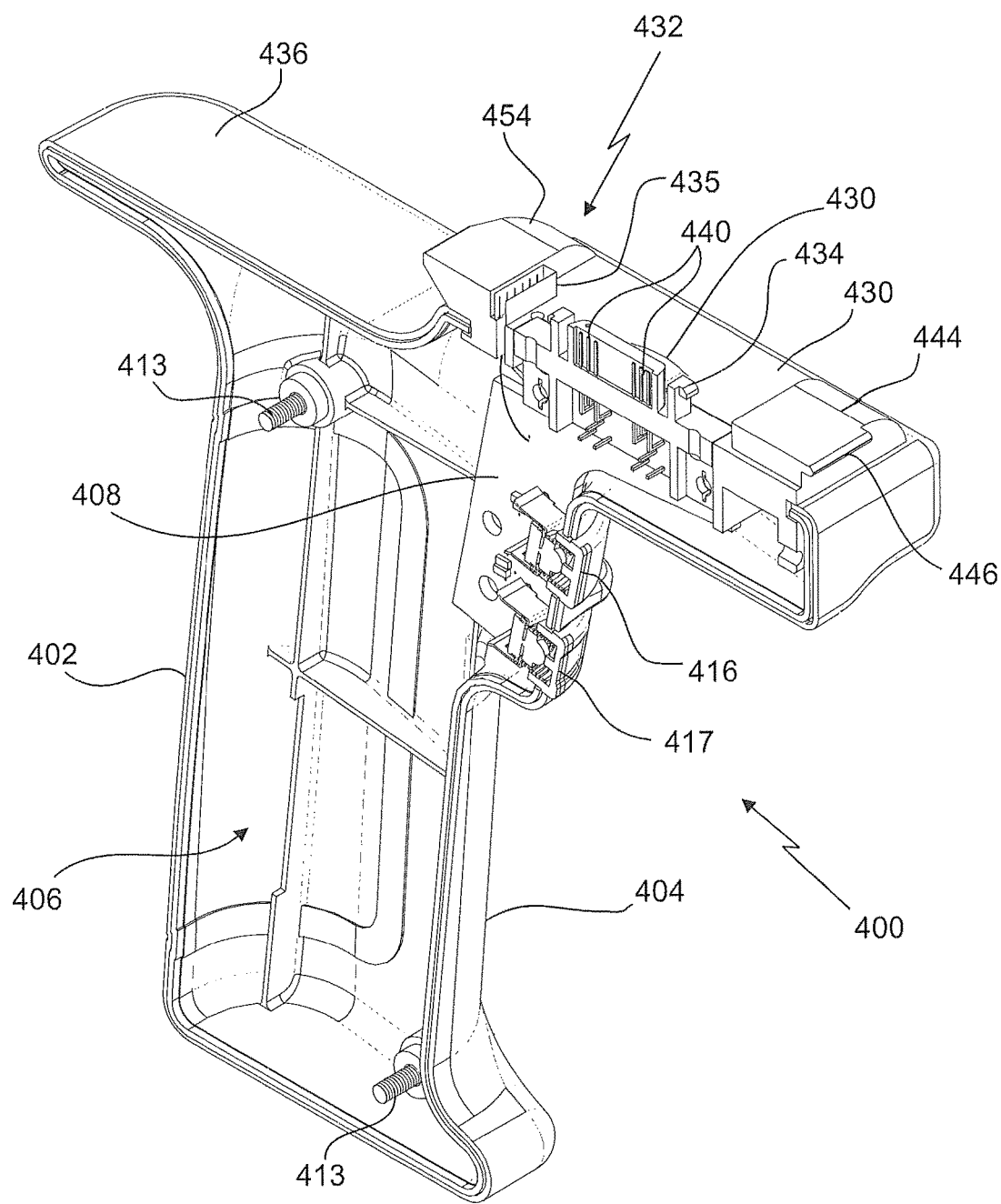
FIG. 7 is a perspective view partially in section of the handle accessory of FIG. 5.

Referring now to FIGS. 5-8, an exemplary embodiment of a probe end 401 is illustrated having a measurement probe housing 102 with a quick-connect mechanical and electrical interface that allows removable and interchangeable device 400 to couple with AACMM 100. In the exemplary embodiment, the device 400 includes an enclosure 402 that includes a handle portion 404 that is sized and shaped to be held in an operator's hand, such as in a pistol grip for example. The enclosure 402 is a thin wall structure having a cavity 406 (FIG. 7). The cavity 406 is sized and configured to receive a controller 408. The controller 408 may be a digital circuit, having a microprocessor for example, or an analog circuit. In one embodiment, the controller 408 is in asynchronous bidirectional communication with the electronic data processing system 210 (FIGS. 2 and 3). The communication connection between the controller 408 and the electronic data processing system 210 may be a wireless, a wired (e.g. via bus 218) or an optical (e.g. via bus 219) connection. The communication connection may also include a direct or indirect wireless connection (e.g. BLUETOOTH wireless communication or IEEE 802.11) or a combination of wired, optical and wireless connections. In the exemplary embodiment, the enclosure 402 is formed in two halves 410, 412, such as from an injection molded plastic material for example. The halves 410, 412 may be secured together by fasteners, such as screws 413 for example. In other embodiments, the enclosure halves 410, 412 may be secured together by adhesives or ultrasonic welding for example.

The handle portion 404 also includes buttons or actuators 416, 417 that may be manually activated by the operator. The actuators 416, 417 are coupled to the controller 408 that transmits a signal to a controller 420 within the probe housing 102. In the exemplary embodiments, the actuators 416, 417 perform the functions of actuators 422 located on the probe housing 102 opposite the device 400. It should be appreciated that the device 400 may have additional switches, buttons or other actuators that may also be used to control the device 400, the AACMM 100 or vice versa. Also, the device 400 may include indicators, such as light emitting diodes (LEDs), sound generators, meters, displays or gauges for example. In one embodiment, the device 400 may include a digital voice recorder that allows for synchronization of verbal comments with a measured point. In yet another embodiment, the device 400 includes a microphone that allows the operator to transmit voice activated commands to the electronic data processing system 210.

In one embodiment, the handle portion 404 may be configured to be used with either operator hand or for a particular hand (e.g. left handed or right handed). The handle portion 404 may also be configured to facilitate operators with disabilities (e.g. operators with missing finders or operators with prosthetic arms). Further, the handle portion 404 may be removed and the probe housing 102 used by itself when clearance space is limited. As discussed above, the probe end 401 may also comprise the shaft of the seventh axis of AACMM 100. In this embodiment the device 400 may be arranged to rotate about the AACMM seventh axis.

In one embodiment, the probe end 401 includes a mechanical and electrical interface that cooperates with a second connector on the probe housing 102. The connectors may include electrical and mechanical features that allow for coupling of the device 400 to the probe housing 102. In one embodiment, the interface 426 includes a first surface 430 having a mechanical coupler 432, a first electrical connector 434 and a second electrical connector 435 thereon. The enclosure 402 also includes a second surface 436 positioned adjacent to and offset from the first surface 430. In the exemplary embodiment, the second surface 436 is a planar surface offset a distance of approximately 0.5 inches from the first surface 430. As will be discussed in more detail below, this offset provides a clearance for the operator's fingers when tightening or loosening a fastener such as collar 438. The interface 426 provides for a relatively quick and secure electronic connection between the device 400 and the probe housing 102 without the need to align connector pins, and without the need for separate cables or connectors.

The first electrical connector 434 extends from the first surface 430 and includes one or more connector pins 440 that are electrically coupled in asynchronous bidirectional communication with the electronic data processing system 210 (FIGS. 2 and 3), such as via one or more buses 218 for example. The bidirectional communication connection may be wired (e.g. via bus 218), wireless (e.g. BLUETOOTH wireless communication or IEEE 802.11), or a combination of wired and wireless connections. In one embodiment, the first electrical connector 434 is electrically coupled to the controller 420. The controller 420 may be in asynchronous bidirectional communication with the electronic data processing system 210 such as via one or more electrical bus 218 for example.

Similarly, the second electrical connector 435 extends from the first surface 430 adjacent the electrical connector 434. The second electrical connector 435 may include one or more connector pins that are electrically coupled in asynchronous and bidirectional communication with the electronic data processing system 210 via optical bus 219 in one embodiment. Of course, the second optical connector 435 could also be coupled to the electrical bus 218. In the exemplary embodiment of FIG. 6, the second electrical connector 435 allows for high speed data transmission. In one embodiment, the data transmission via second electrical connector is greater than 12 megabytes per second and is compliant with the Universal Serial Bus standard. In another embodiment, the data transmission via second electrical connector 435 is up to 625 megabytes per second and is compliant with the USB 3.0 standard. In still another embodiment, the data transmission via second electrical connector 435 is up to 125 megabytes per second and is compliant with the gigabit Ethernet (IEEE 802.3-2008) standard.

As will be discussed in more detail below, the second electrical connector 435 is coupled to the electronic data processing system 210 via a transceiver 421 within the probe housing 102. The transceiver 421 is configured to transform the electrical signal from the connector 435 to an optical signal. The transceiver provides bi-directional communication between an optical communications media and an electrical communications media. In the exemplary embodiment, the transceiver 421 receives and transmits electrical signals to the device 400 via second electrical connector 435 and receives and transmits optical signals via optical bus 219. In one embodiment, the transceiver 421 is integral with the controller 420. In yet another embodiment, the second electrical connector 435 is an optical connector and the transceiver 421 may be omitted. In one embodiment, the bus 241 may also include both electrical and optical signal lines, in which case the transceiver 421 is used just for converting the electrical signals into optical signals while allowing the optical signals to pass through. It should be appreciated that in embodiments where the bus 241 is solely an optical bus, the transceiver 421 may be omitted.

The electrical connectors 434, 435 are positioned to provide a relatively quick and secure electronic connection with corresponding electrical connectors on probe housing 102. The electrical connectors connect with each other when the device 400 is attached to the probe housing 102. The electrical connectors may each comprise a metal encased connector housing that provides shielding from electromagnetic interference as well as protecting the connector pins and assisting with pin alignment during the process of attaching the device 400 to the probe housing 102.

The mechanical coupler 432 provides relatively rigid mechanical coupling between the device 400 and the probe housing 102 to support relatively precise applications in which the location of the device 400 on the end of the arm portion 104 of the AACMM 100 preferably does not shift or move. Any such movement may typically cause an undesirable degradation in the accuracy of the measurement result. These desired results are achieved using various structural features of the mechanical attachment configuration portion of the quick connect mechanical and electronic interface of an embodiment of the present invention.

Figure 8:
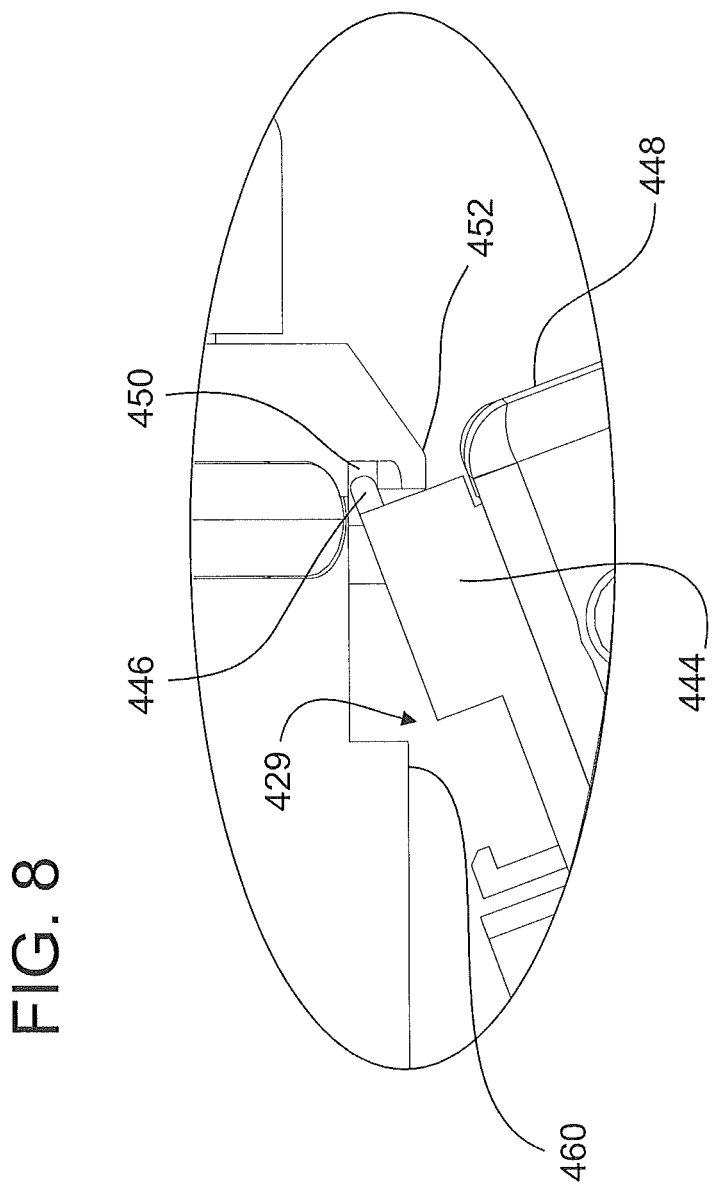
FIG. 8 is an enlarged view of a portion of the probe end of FIG. 6.

In one embodiment, the mechanical coupler 432 includes a first projection 444 positioned on one end 448 (the leading edge or "front" of the device 400). The first projection 444 may include a keyed, notched or ramped interface that forms a lip 446 that extends from the first projection 444. The lip 446 is sized to be received in a slot 450 defined by a projection 452 extending from the probe housing 102 (FIG. 8). It should be appreciated that the first projection 444 and the slot 450 along with the collar 438 form a coupler arrangement such that when the lip 446 is positioned within the slot 450, the slot 450 may be used to restrict both the longitudinal and lateral movement of the device 400 when attached to the probe housing 102. As will be discussed in more detail below, the rotation of the collar 438 may be used to secure the lip 446 within the slot 450.

Opposite the first projection 444, the mechanical coupler 432 may include a second projection 454. The second projection 454 may have a keyed, notched-lip or ramped interface surface 456 (FIG. 6). The second projection 454 is positioned to engage a fastener associated with the probe housing 102, such as collar 438 for example. The mechanical coupler 432 includes a raised surface projecting from surface 430 that adjacent to or disposed about the electrical connector 434 which provides a pivot point for the interface 426. This serves as the third of three points of mechanical contact between the device 400 and the probe housing 102 when the device 400 is attached thereto.

The probe housing 102 includes a collar 438 arranged co-axially on one end. The collar 438 includes a threaded portion that is movable between a first position (FIG. 5) and a second position (FIG. 7). By rotating the collar 438, the collar 438 may be used to secure or remove the device 400 without the need for external tools. Rotation of the collar 438 moves the collar 438 along a relatively coarse, square-threaded cylinder 474. The use of such relatively large size, square-thread and contoured surfaces allows for significant clamping force with minimal rotational torque. The coarse pitch of the threads of the cylinder 474 further allows the collar 438 to be tightened or loosened with minimal rotation.

To couple the device 400 to the probe housing 102, the lip 446 is inserted into the slot 450 and the device is pivoted to rotate the second projection 454 toward surface 458 as indicated by arrow 464 (FIG. 6). The collar 438 is rotated causing the collar 438 to move or translate in the direction indicated by arrow 462 into engagement with surface 456. The movement of the collar 438 against the angled surface 456 drives the mechanical coupler 432 against the raised surface 460. This assists in overcoming potential issues with distortion of the interface or foreign objects on the surface of the interface that could interfere with the rigid seating of the device 400 to the probe housing 102. The application of force by the collar 438 on the second projection 454 causes the mechanical coupler 432 to move forward pressing the lip 446 into a seat on the probe housing 102. As the collar 438 continues to be tightened, the second projection 454 is pressed upward toward the probe housing 102 applying pressure on a pivot point. This provides a see-saw type arrangement, applying pressure to the second projection 454, the lip 446 and the center pivot point to reduce or eliminate shifting or rocking of the device 400. The pivot point presses directly against the bottom on the probe housing 102 while the lip 446 is applies a downward force on the end of probe housing 102. FIG. 6 includes arrows 462, 464 to show the direction of movement of the device 400 and the collar 438. It should be appreciated that the offset distance of the surface 436 of device 400 provides a gap between the collar 438 and the surface 436 (FIG. 7). The gap allows the operator to obtain a firmer grip on the collar 438 while reducing the risk of pinching fingers as the collar 438 is rotated. In one embodiment, the probe housing 102 is of sufficient stiffness to reduce or prevent the distortion when the collar 438 is tightened.

The coupling of the probe end 401 to the end of the arm portion 104 creates a communication connection between the optical bus 219 and the transceiver 421. This coupling further creates a communication connection between the bus 218 and the controller 420. In this manner, signals may be transmitted and received over both busses 218, 219. It should be appreciated that it is desirable for the segments 106, 108 of the arm portion 104 and the probe end 401 to be rotatable on several axis of rotation to allow the probe end 401 to be positioned to make a desired measurement without inhibiting the user. As a result, one or more electrical and optical connections are made at each of the bearing cartridge groupings 110, 112, 114 for each rotational joint. These connections allow the arm portion 104 to be moved and rotated without interference from electrical conductors or optical conductors.

Figure 9:
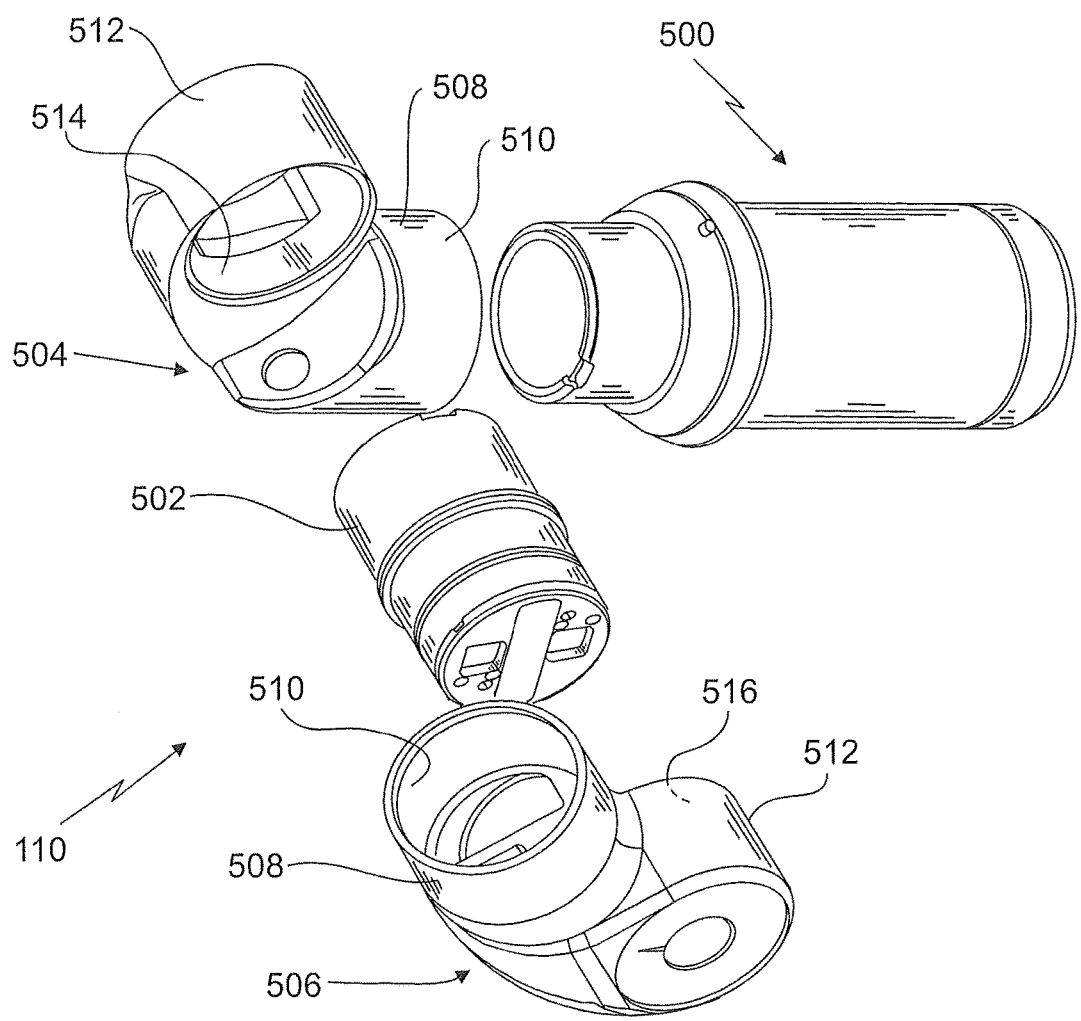
FIG. 9 is a partial exploded view illustrating a pair of encoder/bearing cartridges being assembled between two dual socket joints in accordance with an embodiment.

Referring now to FIGS. 9-11, an exemplary embodiment is shown of an arm rotational connection using groupings of bearing cartridges, such as bearing cartridge grouping 110 for example, that include a slip ring assembly that allows for rotation of the arm segments while allowing fiber optic or electrical conductors (or any other element) to pass through the arm. As discussed above, each of the rotational connections of the articulated arm utilizes a modular bearing/encoder cartridge such as cartridge 500 or cartridge 502 for example. These cartridges 500, 502 are mounted in the openings of dual socket joints 504, 506. Each socket joint 504, 506 includes a first cylindrical extension 508 having a first recess or socket 510 and a second cylindrical extension 512 having a second recess or socket 514. Generally sockets 510, 514 are positioned 90° to one another although other relative, angular configurations may be employed. Cartridge 502 is positioned in each socket 516 of dual socket joints 504, 506 to define a hinge joint, while cartridge 500 is positioned in socket 510 of joint 506 to each define longitudinal swivel joint. Modular bearing/encoder cartridges 500, 502 provide advantages in permitting separate manufacturer of a pre-stressed or preloaded dual bearing cartridge on which is mounted the modular encoder components. This bearing encoder cartridge can then be fixedly attached to the external skeletal components, such as dual socket joints 504, 506 for example, of the articulated arm portion 104. The use of such cartridges is advantageous in permitting high-quality, high-speed production of these sophisticated subcomponents of articulated arm portion 104.

In some embodiments, there may be as many as four different cartridge types, two "long" axial cartridges that allow for swivel rotation, and to "short" cartridges that provide a hinge joint. Each cartridge includes a pre-loaded bearing arrangement and a transducer which may comprise a digital encoder. While the length of the cartridge may change, for exemplary purposes, we will describe all types of cartridges with respect to cartridge 500.

As shown in FIG. 10, the cartridge 500A includes a pair of bearings 518, 520 separated by an inner sleeve 522 and outer sleeve 524. It is desirable that the bearings 518, 520 are preloaded. In this embodiment, such preload is provided by sleeves 522, 524 being of different lengths so that upon tightening, a preselected preload force is generated on the bearings 518, 520. Bearings 518, 520 are sealed using seals with this assembly being rotatably mounted on a shaft 528. At its upper surface, the shaft 528 terminates at a shaft upper housing 530. An annulus 532 is defined between shaft 528 and shaft upper housing 530. This entire assembly is positioned within outer cartridge housing 534 with the shaft 528 and its bearing assembly being securely attached to the housing 534 using a combination of an inner nut 527 and an outer nut 529. Note that upon assembly, the upper portion of the outer housing 534 will be received within the annulus 532. It will be appreciated that the preload is provided to bearings 518, 520 upon the tightening of the inner and outer nuts which provide compression forces to the bearings and, because of the difference in length between the inner and outer spacers 522, 524, the desired level of pre-load will be achieved.

In one embodiment, the bearings 518, 520 are duplex ball bearings. In order to obtain the desired preloading, it is important that the bearing faces be parallel. The parallelism affects the evenness other preloading about the circumference of the bearing. Uneven loading will give the bearing a rough uneven running torque feel, and may result in an undesirable radial runout and or reduced encoder performance. The spacers 522, 524 are used to enhance the separation of the bearings. In the exemplary embodiment the cartridge housing 534 and spacers 522, 524 are made from aluminum, and may be machined in a desired length and parallelism. Because a common material is used for the inner and outer spacers, changes in temperature will not result in differential expansion which could compromise the preload. The use of seals 526 provide sealed bearings since any contamination thereof may affect all rotational movement and potential encoder accuracy.

While in the exemplary embodiment the cartridge 500A includes a pair of bearings, cartridge 500A could also include a single bearing or three or more bearings. Thus, each cartridge includes at least one bearing. In one embodiment, an optical encoder system may be arranged in end 554. The encoder system includes a disk 562 and one or more read heads 563. The encoder system includes a pattern of measurable characteristics. A light source in the read head sends light onto the disk pattern, and reflected or transmitted light from the read head is received by optical detector on the read head. This information is used to determine the angle of rotation.

The cartridges may either have unlimited rotation, or may allow for only limited rotation. For limited rotation, in an embodiment, a groove 536 on a flange 538 on the outer surface of the housing 534 provides a cylindrical track which receives a shuttle (not shown). The shuttle rides within the track 536 until it abuts a removable shuttle stop, such as a rotation stops set screw for example, whereupon further rotation will be precluded.

In an exemplary embodiment, the cartridge 500 is a cartridge 500A, shown in FIG. 10. The cartridge is allowed to move freely for unlimited rotation. In this embodiment, a rotary coupler, such as optical rotary joint 540, for example, is used to allow signals traveling on fiber-optic cables 219C, 219D to traverse the joint. The shaft 528 has an opening 542 therethrough. Positioned within the opening 542 is the optical rotary joint 540. The fiber-optic cable 219C enters the cartridge 500A via a passageway 544 in the upper housing 530. The fiber-optic cable 219 enters a bushing 546 that is secured against a shoulder 548 within an upper portion of the opening 542. Flushly mounted adjacent the end of the bushing 546 is a graded index rod lens 550 that is coupled to the end of the fiber optic cable 219C.

Similarly, the fiber-optic cable 219D enters the cartridge 500A via a passage 552 in end 554 of housing 534. The fiber-optic cable 219D enters a bushing 556 that is secured to the lower portion 554. Flushly mounted adjacent the end of bushing 556 is another graded index rod lens 558. The graded index rod lens 558 is coupled to the end of the fiber optic cable 219D.

The lenses 550, 558 form an optocoupler that allows signals from the fiber-optic cables 219C, 219D to traverse the gap between the lenses. The focal lengths of the lenses 550, 558 are selected so that each lens collimates a light signal from the fiber into a parallel beam or column of light axially directed at the other lens. The receiving lens will pick up the collimated beam and focus it into the end of the respective optical fiber 219C, 219D. The opposing faces of the lenses 550, 558 have diameters that are substantially greater than the comparable diameter of the fiber-optic cables 219C, 219D. Thus an axial misalignment of the lenses 550, 558 results in significantly less cut off than would occur with the same axial misalignment of the bare fiber ends. Further, the collimation of the optical signal within the rotary coupler permits the lens gap to be significantly larger than the gap between fibers in a direct fiber to fiber rotary joint for sustaining comparable optical coupling transmission. In one embodiment, the lens gap is less than 1/10 of an inch. In one embodiment, the optical rotary joint 540 is a model FO228 fiber-optic rotary joint produced by MOOG, Inc.

It should be appreciated that the cartridge 500A with the optical rotary joint 540, forms a rotary interface that allows the shaft 528 to rotate independently of the housing 534 while still allowing signals to be transferred across the rotational connection. In the exemplary embodiment, the shaft 528 and housing 534 may move with unlimited rotation. The optical rotary joint 540 performs a signal transfer function only and is nonstructural, meaning that it provides no mechanical function for the rotational connection. It should be appreciated that this provides advantages in allowing the transfer of signals along the length of the arm portion 104 while still allowing the individual sections or segments of the arm portion 104 to rotate freely.

Referring now to FIG. 11, another embodiment of the cartridge 500 is a cartridge 500B shown having a hybrid rotary coupler, such as slip ring 560 for example. The hybrid slip ring 560 includes a bushing 546 mounted within opening 542 against the shoulder 548. The fiber-optic cable 219C enters the cartridge through passage 544 and extends into the bushing 546. A graded index rod lens 550 is flushly mounted on the end of the bushing 546. In this embodiment, an electrical cable 218 C that includes at least one electrical conductor also enters through the passage 544 and enters the bushing 546. At least one contact ring 564 is coupled to a conductor within the electrical cable 218C and is mounted to the end of the bushing 546 within the opening 542.

The hybrid slip ring 560 further includes a fiber-optic cable 219D that enters the end 554 of housing 534 via passage 552 and extends into the bushing 556. A graded index rod lens 558 is flushly mounted on the end of bushing 556. A second electrical cable 219D enters the housing 534 via passage 552 and enters the bushing 556. At least one transfer member 568, which may be a contact ring, is coupled to a conductor within the electrical cable 218D and is mounted to the end of bushing 556 within opening 542. The contact ring 564 and transfer members 568A, 568B are arranged to be in sliding contact with each other during operation to allow electrical signals to pass therebetween. The transfer members 568A, 568B may be made from a suitable material such as metal or graphite for example. In another embodiment, the transfer members 568A, 568B may be one or more brushes arranged in contact with the outer diameter of the contact ring 564. During operation, signals being transmitted on the fiber-optic cables 219C, 219D traverse the joint via lenses 550, 558 as discussed above. Signals are transmitted on electrical cables 218C, 218D to traverse the joint via contact ring 564 and transfer members 568A, 568B. In one embodiment, the hybrid slip ring 560 which is configured to provide both electrical and optical signal transfer in an integrated assembly may be a model H18 available from MOOG™, Inc.

It should be appreciated that the slip ring used in the cartridge 500B may accommodate a plurality of electrical conductors. The communication across the slip ring may be one directional, bidirectional, synchronous or asynchronous. In one embodiment, the bus 218 allows for the transfer of data signals and electrical power over the bus.

Figure 12:
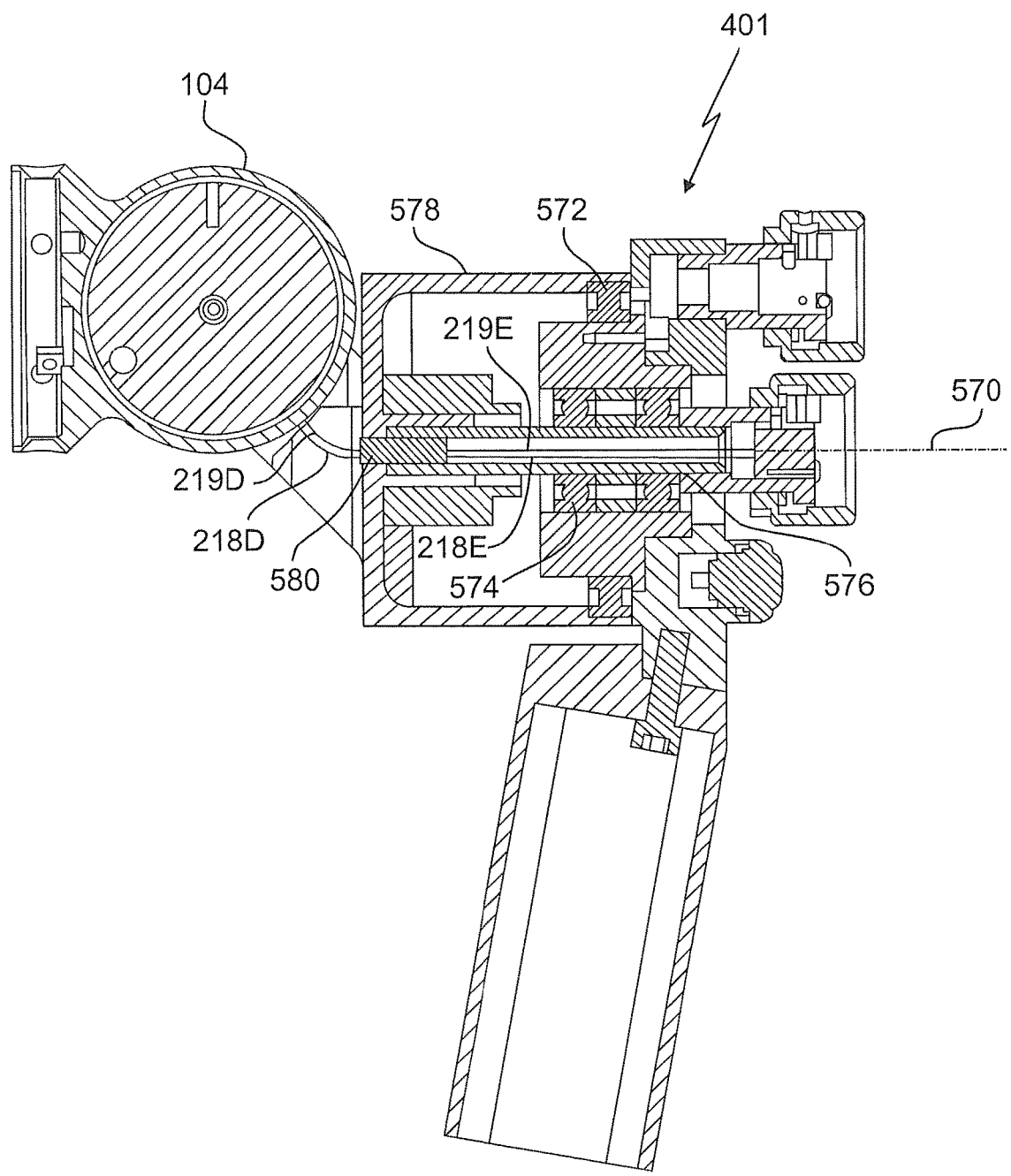
FIG. 12 is a sectional view of the probe end in accordance with another embodiment, the probe end having optical rotary joint of FIG. 10 or a slip ring of FIG. 11.

The optical rotary joint 540 and the slip ring 560 may be used in other joint configurations than cartridges 500, 502 of FIG. 9. FIG. 12 shows a probe end 401 that is rotatable about an axis 570. In this embodiment, the probe end 401 includes a pair of bearings 572, 574. The bearings 572, 574 allow the probe end 401 to rotate about a shaft 576 relative to a housing 578 which is coupled to the end of the arm 401. Arranged within the housing 578 is a rotary coupler 580, which might be a rotary coupler 540 as shown in FIG. 10 or a rotary coupler 560 as shown in FIG. 11, the rotary coupler 540, 560 is configured to allow signals to be transferred from the probe end 401 to the arm portion 104. An optical bus 219E extends from a controller (not shown) in the probe end 401 through the shaft 576 to the rotary coupler 580. Similarly, the bus 218E extends from the controller through the shaft 576 to the rotary coupler 580. Busses 218D, 219D are coupled on one end to the rotary coupler 580 and passes through into the arm portion 104. Thus, rotary coupler 580 provides for signal transfer function between the probe and 401 to the arm portion 104 over busses 218, 219.

Figure 13:
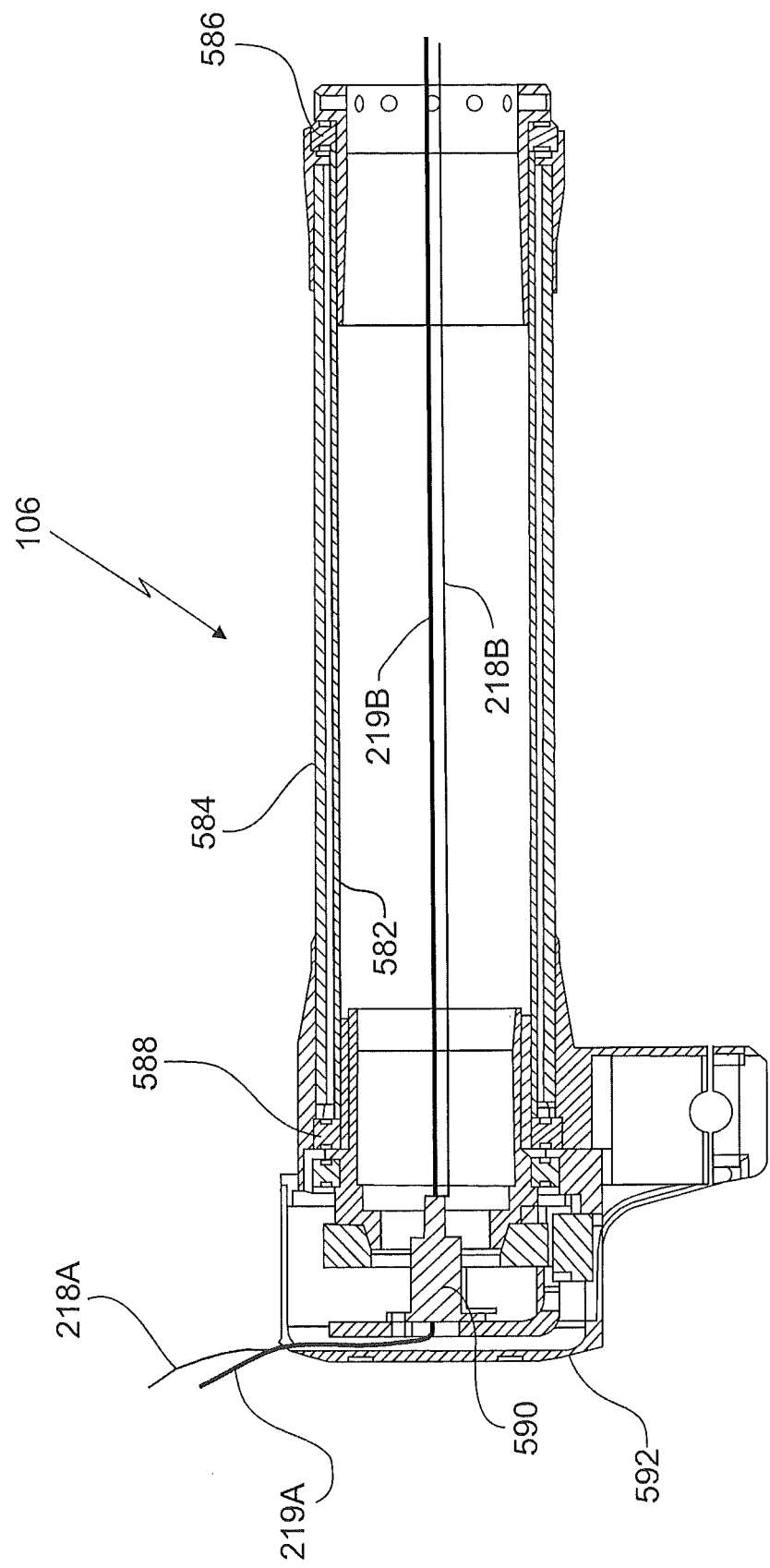
FIG. 13 is a sectional view of a portion of an arm segment in accordance with another embodiment, the arm section having an optical rotary joint of FIG. 10 or a slip ring of FIG. 11.

Referring now to FIG. 13, the optical rotary joint 540 and the slip ring 560 may further be used in arm segments, such as arm segment 106 for example. In this embodiment, the arm segment 106 includes an inner shaft 582 and an outer housing 584. The inner shaft 582 is configured to rotate independently of the outer housing 584. The inner shaft 582 rotates on a first bearing 586 and a second bearing 588 arranged on opposite ends of the inner shaft 582. As with the embodiments discussed above, bearings 586, 588 may be preloaded and press fit into the housing 584. Arranged on one end of the arm segment 106 is a rotary coupler 590. In this embodiment, the rotary coupler 590 may be a rotary coupler 540 as in FIG. 10 or a rotary coupler 560 as in FIG. 11, the rotary coupler 590 configured to allow signals to be transferred between busses 218A, 219A arranged at end 592 of inner shaft 582 and busses 218B, 219B coupled to the inner shaft 582. Thus, the signals may be transferred without interfering with the rotation of the inner shaft 582.

Figure 14:
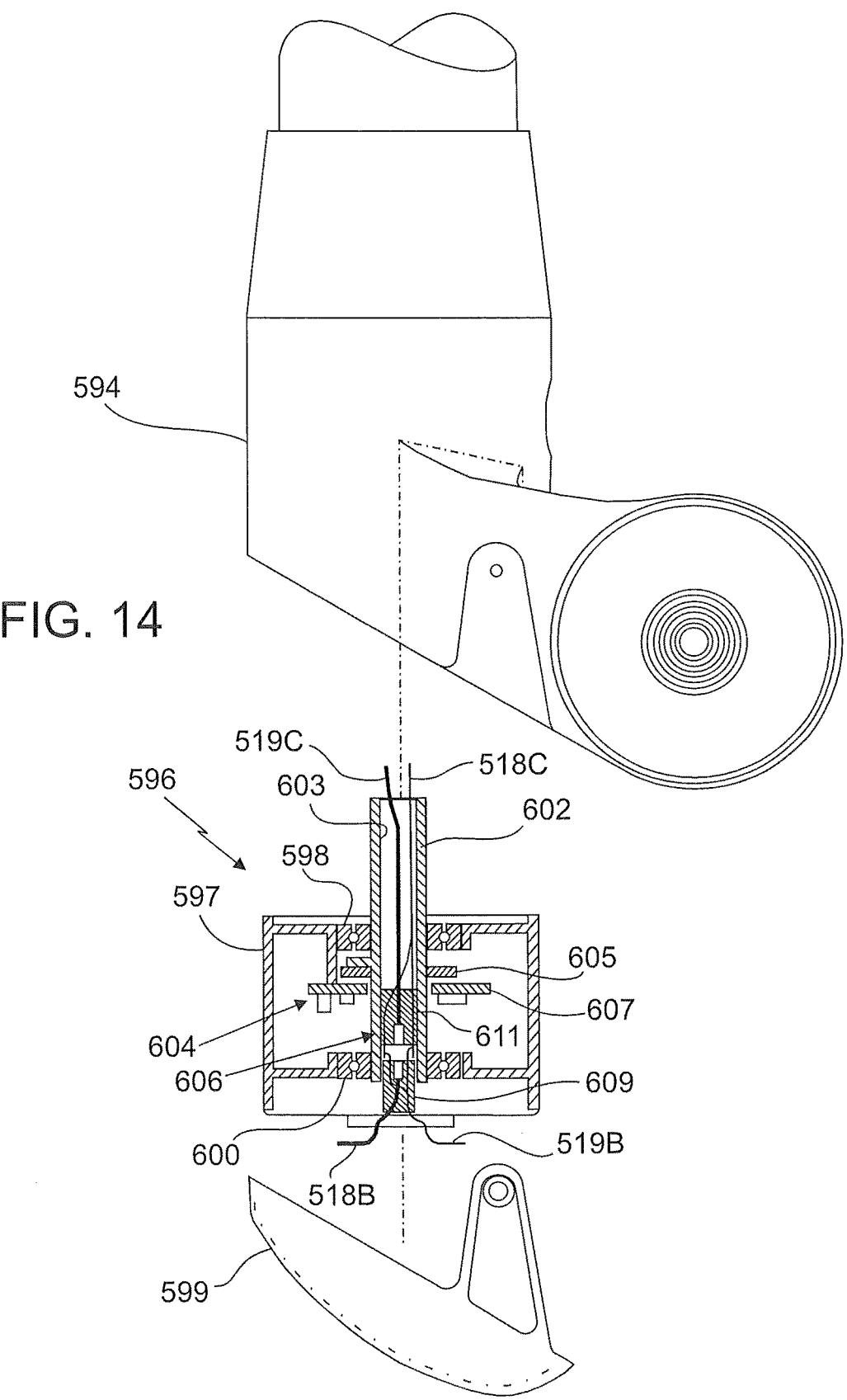
FIG. 14 is sectional view of a two dual axis rotational connection in accordance with another embodiment, the rotational connection having one or more optical rotary joints or slip rings of FIG. 10 or FIG. 11.

Still another embodiment is shown in Figure FIG. 14 providing rotational connection having two rotational axes with one of the connections providing greater than 360 degrees of rotation. In this embodiment, the rotational connection has a housing 594 sized to receive an encoder assembly 596. The encoder assembly 596 includes a housing 597 having a pair of bearings 598, 600 that define an axis of rotation about which a shaft 602 rotates relative to the housing 597. A rotary encoder 604 is disposed about the shaft 602, which generates a signal in response to rotation of the shaft 602. In one embodiment, the rotary encoder 604 includes an encoder disk 605 coupled to rotate with the shaft 602 and a read-head 607 coupled to the housing 597. The encoder disk includes a plurality of measurable characteristics that are illuminated by the read head. Reflected or transmitted light through the disk are received by the read head and used to obtain an angular reading. A cover 599 is configured to enclose the encoder assembly 596 within the housing 594.

The shaft 602 includes a bore 603 that extends therethrough. The bore 603 is sized to receive a rotary coupler 606, which is at least partially disposed therein. A first segment of busses 518B, 519B are received in one end of the bore 603 and coupled to a first half 609 of the rotary coupler 606. The first half 609 is fixed relative to the housing 597. A second segment of the busses 518C, 519C is coupled to the second half 611 of the rotary coupler 606. The second half 611 is fixed to the bore 603 and rotates with the shaft 602. The rotary coupler 606 is substantially similar in operation to the optical rotary joints 540, 560 to allow signals to be transferred between the busses 518B, 519B and busses 518C, 519C without interfering with the rotation of the shaft 602 relative to the encoder assembly 596.

Figure 15:
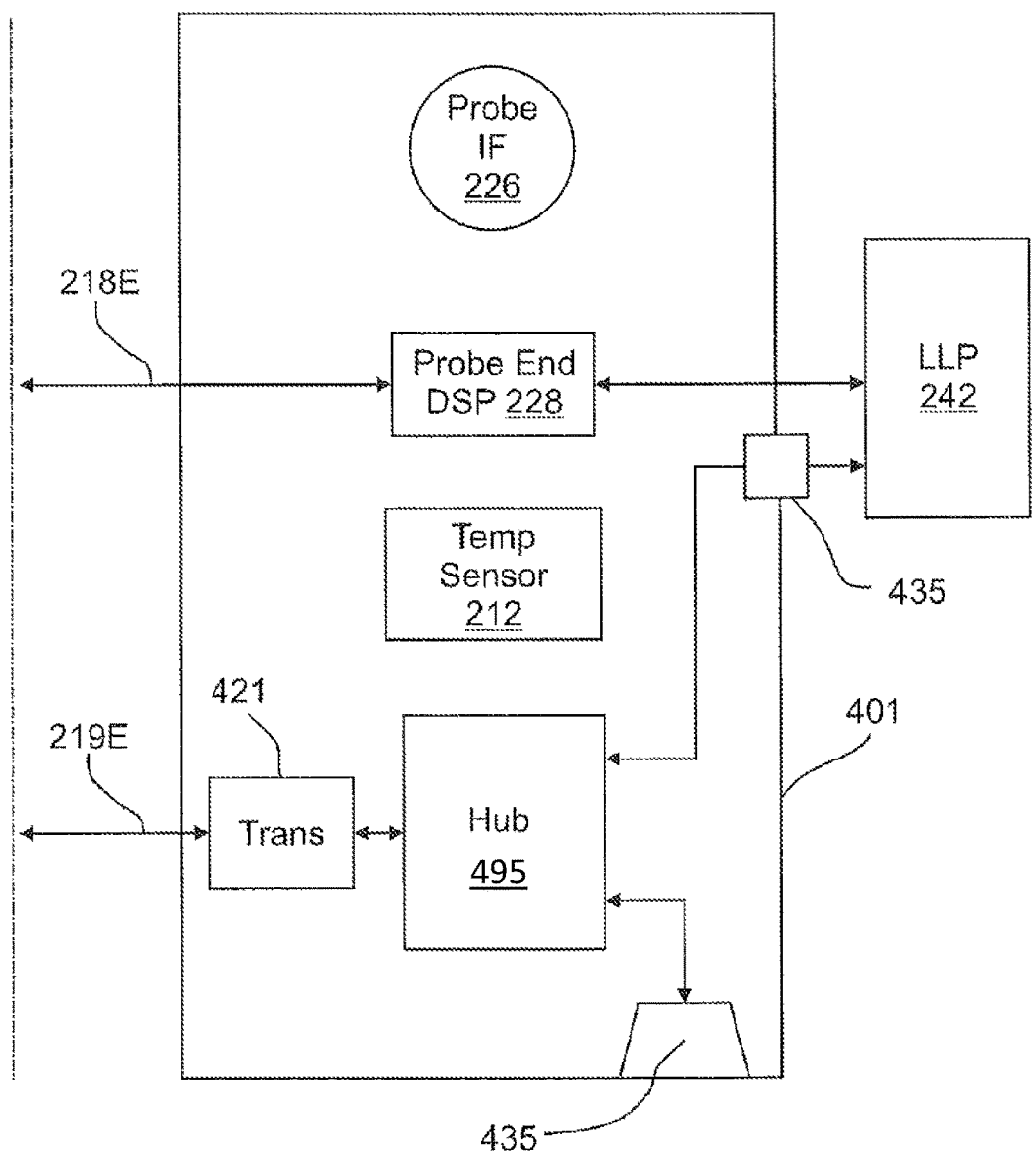
FIG. 15 is a schematic diagram of another embodiment of the probe end of FIG. 5.

The buses 218, 219 allow the bidirectional, asynchronous transfer of signals between the data processing system 210 and the probe end 401. In some applications, it may be desirable to connect multiple devices or accessories on the probe end 401 as shown in FIG. 15. For example, it may be desirable to have both a laser line probe 242 and a high definition camera separately connected to the probe end. In one embodiment, multiple connection points are coupled by separate optical busses to the electronic data processing system 210. In another embodiment, the probe end 401 includes a single optical bus 219E that couples with a transceiver 421. The transceiver 421 allows for bi-directional communication between an optical and an electrical communications medium. Opposite the optical bus 219E, the transceiver 421 is connected to a routing device 495, such as a hub (for a USB 3.0 connection) or a switch (for a gigabit Ethernet connection). The routing device 495 allows multiple accessory devices to couple with a single optical bus 219E.

In other embodiments of the present invention, the device 400 coupled to the AACMM 100 may include a functional device that utilizes the high transmission speed of the optical bus 219E to transmit data to the electronic data processing system 210. The device 400 may be, but is not limited to a high definition still camera, a high definition video camera (e.g. greater than 1280×720 pixels), a bar-code scanner, thermal scanner, an audio recording system, an image projector, a time of flight scanner, a flying spot scanner, a structured light scanner and an IR thermometer. In one embodiment, the device 400 may include multiple video cameras, including but not limited to "pico" cameras, "ultra miniature" cameras or three dimensional image cameras for example. In one embodiment, the device 400 may include a retroreflector holder such as that described in commonly-assigned U.S. Pat. No. 7,804,602 entitled "Apparatus and Method for Relocating an Articulating-Arm Coordinate Measuring Machine" which is incorporated herein in its entirety. In yet another embodiment, the device 400 may include an ultrasonic probe such as that described in commonly-owned U.S. Pat. No. 5,412,880 entitled "Method of Constructing a 3-Dimensional Map of a Measurable Quantity Using Three Dimensional Coordinate Measuring Apparatus" which is incorporated by reference herein in its entirety. In an embodiment, the device 400 includes multiple functions such as an image projector and a laser line probe. The image (e.g. computer aided design or "CAD") data may be transmitted via bus 218E to the image projector while the data acquired by the LLP image sensor may be transmitted via the optical bus 219E. It should be appreciated that the integration of these devices may provide advantages in allowing the operator to acquire measurements faster and with a higher degree of reliability. For example, with the still camera or video camera device attached, the operator may record high definition image or images of the object being measured with the device. The image data may be transmitted via the optical bus 219 while the measurement data is transmitted simultaneously via bus 218. These images may be displayed on display 328, output to a video monitor via HDMI port 311, or incorporated into an inspection report for example. In one embodiment, the operator may place graphical markers on the displayed image to define measurement points via the user interface board 202. In this way, the operator can later recall the marked up image from memory and quickly see where to make measurements. In other embodiments, a video is captured of the object being measured. The video is then replayed via the user interface board 202 to assist the operator in repeating multiple measurements on the next object to be inspected or as a training tool for new operators.

Example electronics utilized in an AACMM 100 in accordance with another embodiment are shown in FIGS. 16A-E. In this embodiment, information from the encoder systems, sensors, and other peripheral hardware located away from the base 116 (e.g., a LLP that can be mounted to or within the removable handle 126 on the AACMM 100) may all communicate via an electronic bus 1601 that transmits electrical signals. For simplicity, the bus will be illustrated as having two different portions 1618 and 1619. However, these sections 1618 and 1619 may be included in a common bus. As will be seen more clearly from the below, section 1618 may be referred to as a "low speed" or "encoder" portion of the electronic bus 1601 and section 1619 may be referred to as the "high speed" or "peripheral hardware" portion of the bus. The width of the bus 1601 as whole may vary with the width of the high speed 1619 and low speed 1618 portions thereof.

According to one embodiment, the width of the high speed portion 1619 of the bus 1601 is related to the particular communication protocol being used in that portion. For instance, data may be transferred along the high speed portion 1619 by any of the following protocols with the number of wires (or other conductors) shown in parenthesis: GigE Ethernet (four wire pairs-eight total wires), 10/100 Ethernet (two wire pairs-four wires total); FPD Link II/III or Channel Link II/III (one pair of wires-two total wires); USB3.0 (three wire pairs—six total wires). In the above examples, it has been assumed that the only communication is unidirectional communication from the probe end 401 to the base 116 (FIG. 1). Of course, additional wires may be required if bi-directional communication is desired. Further communications protocols such as Peripheral Component Interconnect (PCI) Express, FireWire, or Camera Link may also be utilized.

All of the above described communication protocols are serial in nature. As such, in the event that peripheral device provides parallel data into a serial format. To that end, the data from the peripheral device may be converted from parallel to serial by a serializer/deserializer (SerDes). In one embodiment, a serializer is included at the probe end 401 and a deserializer is included at the base 116. In another embodiment, a serializer/deserializer device is used at both the probe end 401 and at the base 116 even if each device uses only one of conversion from parallel to serial or conversion from serial to parallel. In an embodiment, a serializer/deserializer may provide transmit emphasis and receive equalization to provide high speed serial data conversion from parallel to serial form or serial to parallel form. Through the use of transmit emphasis and/or receive equalization, high speed data transfer may be made possible over the bus 1601.

The embodiment shown in FIG. 16A includes an electronic data processing system 1610 including a base processor board 1604 for implementing the base processing system, a user interface board 1602, a base power board 1606 for providing power, a BLUETOOTH wireless communication module 232, and a base tilt board 1608. The user interface board 1602 includes a computer processor for executing application software to perform user interface, display, and other functions described herein.

As shown in FIG. 16B-16E, the electronic data processing system 1610 is in communication with the aforementioned plurality of encoder systems via one or more encoder bus portions 1618A, 1618B, 1618C, 1618D. In an embodiment, the data processing system 1610 includes a high speed SerDes 1699 that converts parallel data in the base processor into serial data for transmission over the high speed bus portion 1619 or that converts serial data received from the high speed bus portion 1619 into parallel data for use by the base processor 1604. In an embodiment, the SerDes 1699 includes transmit emphasis and receive equalization capabilities. In an embodiment, the SerDes 1699 is a separate chip provided between the base processor 1604 and the high speed bus portion 1619A. In another embodiment, a high speed SerDes is provided through a custom field-programmable gate array (FPGA) design with signal emphasis provided on some of the FPGA pins. Such an FPGA component may be a separate component (chip) placed between the base processor 1604 and the high speed bus portion 1619A, or it may take the place of the base processor 1604. In the latter case, all of the functions found in microprocessors may be implemented in the FPGA.

In the embodiment depicted in FIGS. 16B-16E, each encoder system generates encoder data and includes: an encoder bus interface 1614, an encoder digital signal processor (DSP) 1616, an encoder read head interface 1634, and a temperature sensor 1612. Other devices, such as strain sensors, may be attached to the encoder portion bus 1618. In some cases, the encoder arm bus interface includes a slip ring 1621A, 1621B, 1621C, 1621D. In the illustrated embodiment, the high speed portion 1619 (shown as sections 1619A-E in FIGS. 16A-16E) includes high speed bus interfaces 1623A, 1623B, 1623C, 1623D. In an embodiment, these interfaces are formed in the same manner as the slip rings that may form the encoder bus interface 1614. Indeed, in one embodiment, the encoder bus interface 1614 and the high speed bus interfaces 1623A, 1623B, 1623C, 1623D are both included in a single multichannel/multi-wire slip ring.

Also shown in FIG. 16E are probe end electronics 1630 that are in communication with the bus 1601 (including the high speed 1619 and encoder portions 1618). The probe end electronics 1630 include a probe end DSP 1628, a temperature sensor 1612, and connections 1680, 1682 that connect the probe end DSP 1628 to the handle 126 or the LLP 242 via the quick-connect interface in an embodiment, and a probe interface 226. The connections 1680 and 1682 may be electrical connections in one embodiment. In an embodiment, the probe end electronics 1630 are located in the measurement probe housing 102 on the AACMM 100. In an embodiment, the LLP 242 is replaced with another accessory such as a distance meter or structured light scanner.

It should be appreciated that while the bus portions 1618A, 1618B, 1618C, 1618D, 1618E, 1619A, 1619B, 1619C, 1619D, 1619E are discussed as individual components, each of the busses 1618, 1619 may be formed from a plurality of individual bus segments (e.g. bus 1618A-1618E, bus 1619A-1619E) that are serially connected to transfer signals within the AACMM 100. As is discussed above, each segment may be separated by a rotary coupler (FIG. 10 and FIG. 11) having an electrical slip ring 1621A-1621D (where high speed interface 1623A, 1623B, 1623C, 1623D is part of the electrical slip ring 1621A, 1621B, 1621C, 1621D). As illustrated, the LLP 242 includes a SerDes 1699. This SerDes could be located in other locations such as the probe end electronics 1630 and could communicate in the same or a similar manner as described above with respect to base processor 1604 (FIG. 16A).

In an embodiment, the electronic data processing system 1610 is located in the base 116 of the AACMM 100, the probe end electronics 1630 are located in the measurement probe housing 102 of the AACMM 100, and the encoder systems are located in the bearing cartridge groupings 110, 112, 114. The probe interface 1624 may connect with the probe end DSP 1628 by any suitable communications protocol, including commercially-available products from Maxim Integrated Products, Inc. that embody the 1-wire(r) communications protocol 1636.

In yet another embodiment, the device is configured to be a paint spray device having a nozzle. In this embodiment, the device 400 receives a signal from the electronic data processing system 210 and selectively sprays one or more colors from one or more spray nozzles that are each connected to a reservoir (e.g. red, green, and blue) each with a single color of paint. It should be appreciated that the spray nozzles may also be an inkjet type of spray mechanism that deposits droplets of paint, ink, pigments or dies onto a surface. The inkjet nozzles may include but are not limited to continuous inkjets, thermal inkjets, and piezoelectric inkjets. Since the electronic data processing system knows the position and orientation of the probe housing 102, the device may receive commands to spray a particular color at a particular location to match a desired image stored in memory. Thus, an image or picture may be reproduced by the device 400 as the operator moves the device 400 across the desired surface (e.g. a wall). This embodiment may also provide advantages in manufacturing environments to create layout markings on an article, such as sheet metal for example.

In another embodiment, the AACMM 100 may be used in an operating room for example. A doctor may use a portable AACMM to determine the location for making an incision or finding a tumor, correlating the position of the probe or measurement device 118 with 3D data from Computer Axial Tomography data. In this case, a projector in device 400 may receive an image signal via the optical bus and project an image on the patient, providing markers or actual replication of CAT scan imagery to guide the surgeon. Surgery performed remotely by manually operated robots may use projection systems in the same way as described above.

In applications where an AACMM is used in a manufacturing environment, a device 400 having a projector may provide guidance for a variety of operations requiring positioning that is driven from 3D CAD or image files. This includes, for example: drilling holes for rivets, instruments, accessories; applying decals or adhesive backed stripes to cars, planes, buses or large parts; painting letters, details or images; grinding/sanding surfaces or welds until they conform to drawing requirements; and locating studs or structural members behind sheathing for nail or screw locations.

Embodiments of this aspect of the present invention provide for visualization of hidden features such as pipes, wiring, ducts, or other objects under walls, bulkheads, floors or behind locked doors helps to determine where cuts can be safely made. These embodiments also provide for projected visualization and guidance for drilling, cutting and access to critical components of explosive ordinance (e.g., when 3D CAD data of the device is available).

According to embodiments of this aspect of the present invention, a projection system for an AACMM projects guidance and part data (e.g., structural CAD data) onto a surface of a part. It also may be used to project images of what is inside walls, structures, or the human body for use in building modification, surgery or other invasive procedures. One or more miniature projectors attached to the arm can project images or data on a part or surface or provide guidance to the operator. The arm/projector combination may provide visualization of features hidden by walls, inside the human body, inside explosive devices, etc. When a 3D record (e.g., CAD drawing, CAT scan, etc.) of the object exists the projector and arm combination can project an image that shows the location of features, as if seeing through the wall.

It is often the case that the surface of an object being measured has distinctive characteristics that may be identified in a camera image. By collecting multiple such images with a camera attached to an articulated arm CMM, it is possible to reconstruct a 3D surface profile for an object using the two-dimensional images. In addition, various visible images or marks may be captured an included in images. Color and other textured features visible on camera images may also be included.

Figure 17:
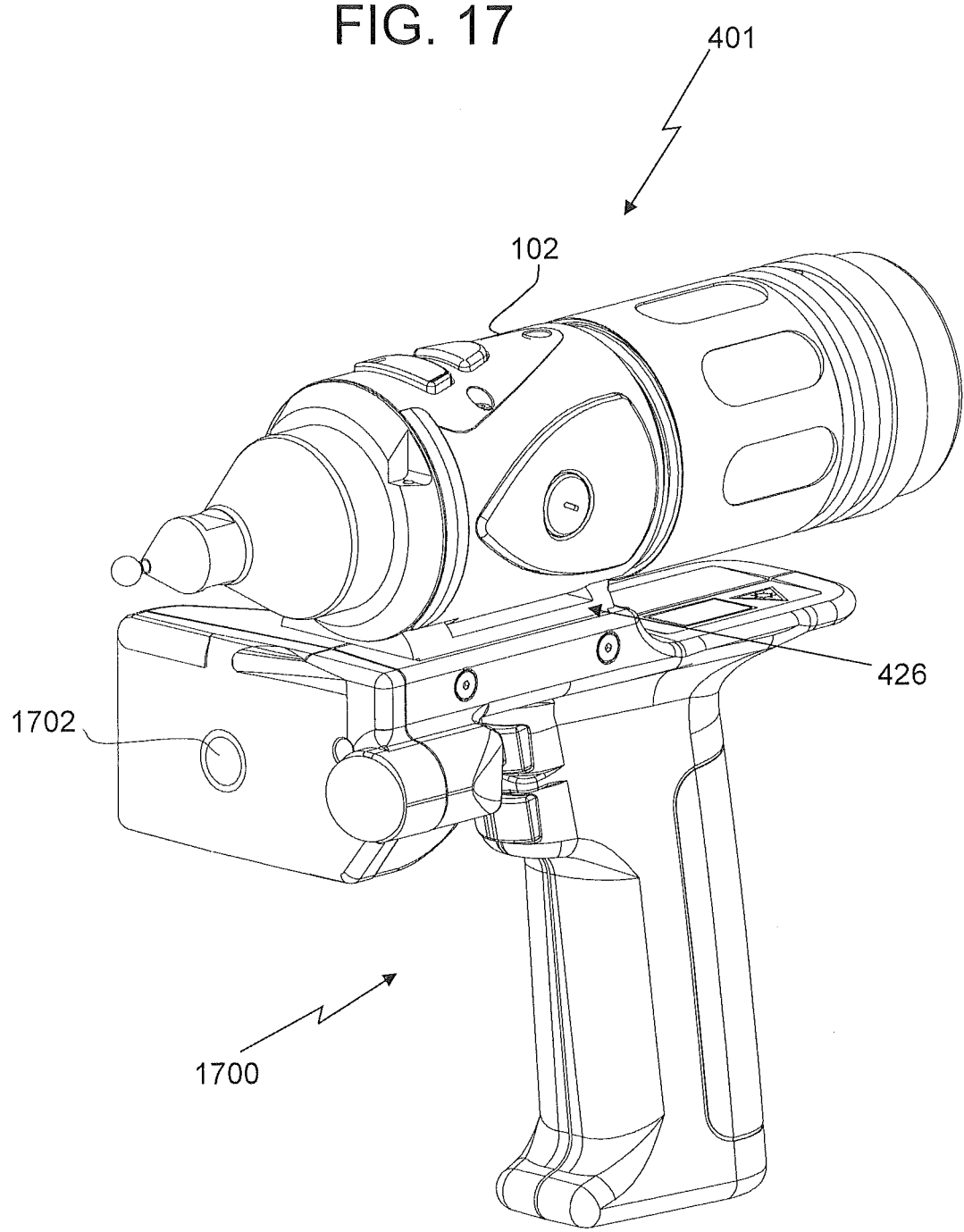
FIG. 17 is a perspective of the probe end of FIG. 5 having attached a measurement device that includes a camera according to an embodiment.

FIG. 17 shows device 1700 that includes a camera 1702. The camera includes a lens (not shown) and photosensitive array (not shown), as is well known in the art. Within the lens (which may be a lens system including a plurality of lens elements), there is a perspective center of the lens. The rays of light passing through the lens may be considered to pass through the perspective center before arriving at the photosensitive array. In a careful analysis, the lens may be characterized to account for lens aberrations, which result in a slight shift in the intersection positions of the rays on the photosensitive array. However, without losing generality, it is possible to say that the rays pass through the perspective center, with aberration correction to the image provided in another step of image processing.

The surface of an object under investigation is imaged by the lens onto the photosensitive array to form an image on the collection of pixels that are a part of the photosensitive array. Light falling on each pixel is converted, within an integration period of the camera, from a charge into a digital signal. An analog-to-digital converter, either located within the photosensitive array (for CMOS arrays) or external to the array (for CCD arrays), performs the conversion from analog to digital signal. The signal for each pixel is typically given in a binary representation of between 8 and 12 bits. The 1's and 0's represented by these bits are delivered over parallel channels, and may be converted into serial form using a serializer/deserializer capability for transmission over a bus line, as explained hereinabove.

Figure 18:
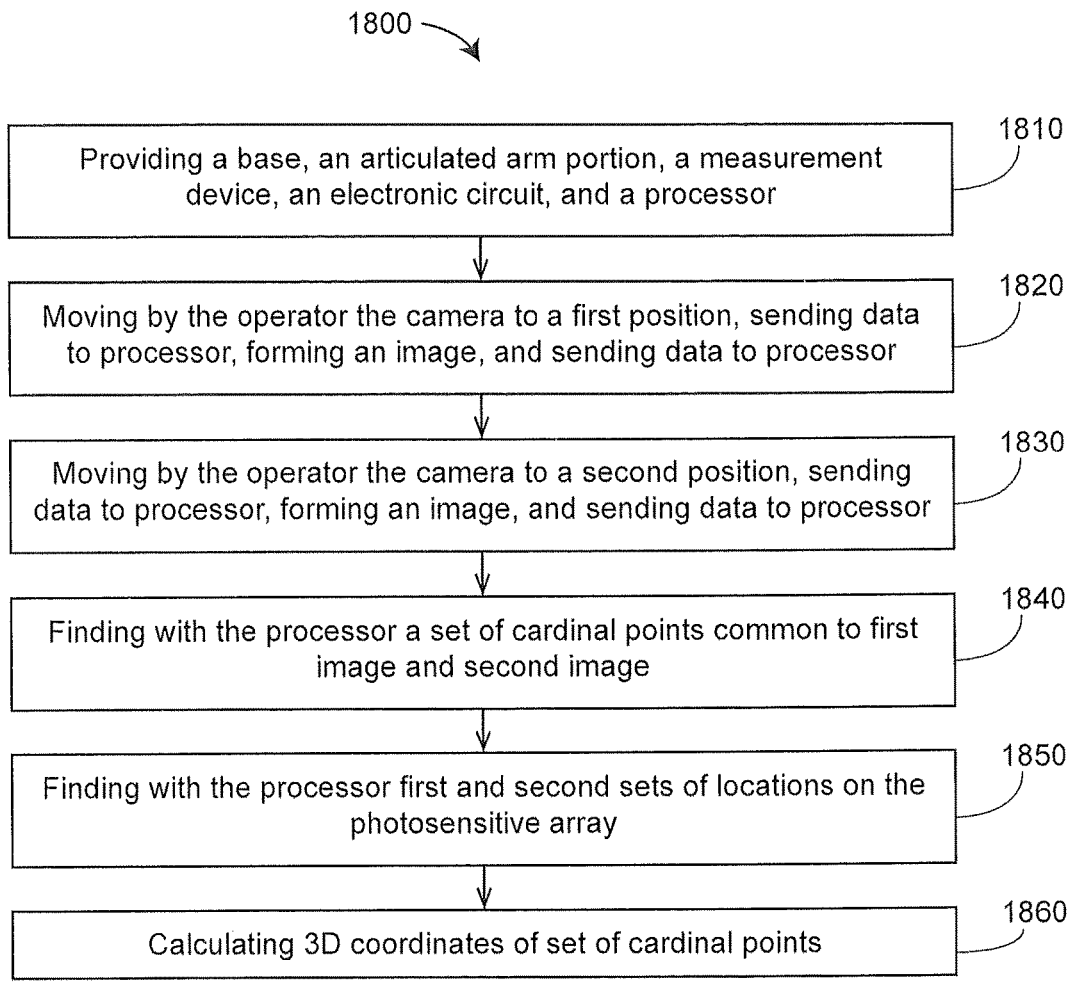
FIG. 18 is a flow chart that includes steps in a method of obtaining a three-dimensional representation of a surface using a camera attached to an articulated arm CMM according to an embodiment.

In an embodiment, multiple two-dimensional (2D) camera images are combined according to a method, described hereinbelow, to obtain a three-dimensional (3D) representation of a surface of an object. A method according to this embodiment is now described with reference made to method 1800 of FIG. 18. In a step 1810, elements of an articulated arm are provided. As described hereinabove, the articulated arm CMM is provided with a base, a manually positionable articulated arm portion having first and second ends with the arm portion being rotationally coupled to the base at one end. The arm includes a plurality (usually two) connected arm segments, each of the arm segments including at least one angle transducer for producing an angle signal. In most cases, the angle transducers are angular encoders, and each arm segment is provided with two angular encoders. Usually one angular encoder measures a swivel movement and a second angular encoder measures a hinge movement. The base and probe end may have additional angular encoders so that most articulated arm CMMs include six or seven angular encoders. Elements of the articulated arm also include a measurement device coupled to the end opposite the base. In this case, the measurement device 1700 includes the camera 1702. An electronic circuit is provided to receive angle signals from the angular encoders and convert these into data corresponding to a position and an orientation for the camera sensor. By this means the image plane of the camera sensor may be known. Also provided is a processor that receives and processes the signals received by the camera and electronic circuit.

In a step 1820, an operator moves the camera 1702 to a first position and a first orientation. The electronic circuit sends the position and orientation information for the camera at this position/orientation. It also receives a first digital signal for the image of the object surface sent through the camera lens onto the photosensitive array.

In a step 1830, the operator moves the camera 1702 to a second position and a second orientation. The electronic circuit sends the position and orientation information for the camera at this position/orientation. It also receives a second digital signal for the image of the object surface sent through the camera lens onto the photosensitive array.

In a step 1840, the processor finds a set of cardinal points common to a first image and a second image. The cardinal points may correspond to 3D physical features of the object or they may correspond to visible markings on the object surface. There is a well developed collection of techniques that may be used to determine such cardinal points, generally using methods referred to as image processing. A commonly used but general category for finding cardinal points is referred to as interest point detection, with the points detected referred to as interest points. According to the usual definition, an interest point has a mathematically well-founded definition, a well defined position in space, an image structure around the interest point that is rich in local information content, and a variation in illumination level that is relatively stable over time. A particular example of an interest point is a corner point, which might be a point corresponding to an intersection of three planes, for example. Another example of signal processing that may be used is scale invariant feature transform (SIFT), which is a method well known in the art and described in U.S. Pat. No. 6,711,293 to Lowe. In the step 1840, the processor finds those cardinal points common to the first and second images to obtain a set of cardinal points.

In a step 1850, the processor determines the locations of each of the cardinal points on the photosensitive array, which is to say on the first image and the second image as provided to the processor in a first digital signal and a second digital signal. In other words, the locations of the cardinal points, in terms of pixel row and column number, are determined for each of the first and second images, to obtain first and second sets of locations.

In a step 1860, the processor calculates 3D coordinates of the set of cardinal points. It does this based on the information provided to it: the first data (i.e., first position and first values orientation derived from information provided by the angle transducers), the first set of locations (for the first image on the photosensitive array), the second data (i.e., second position and second orientation derived from information provided by the angle transducers), and the second set of locations (for the second image on the photosensitive array). The physical basis for obtaining 3D surface coordinates may be understood as follows. The position and orientation of the photosensitive array are known in space for the first and second measurements. Hence the two rectangular regions may be visualized as fixed in space. On top of each of these rectangular regions are superimposed pixels from the photosensitive array in each instance. Cardinal points are located on each of the two photosensitive arrays. A line is drawn from each cardinal point on the photosensitive array (the first image) through the perspective center of the camera lens. This same procedure is carried out for the second instance. The lines projected from each cardinal point on the photosensitive array in the first instance should then intersect the lines projected from the corresponding cardinal points of the photosensitive array in the second instance. The position of intersection of the lines corresponds to a point on the surface. By collecting a number of such intersections, a 3D surface profile of the object may be automatically determined.

In the event that the lines do not exactly intersect, a point of closest approach of the projected lines is taken as the best estimate of the point of intersection. Although not included in the procedure 1800 of FIG. 18, it is clear that the method described hereinabove may be extended to an arbitrarily large number of photosensitive array images so that sets of cardinal points may be obtained from multiple images. In this case, each cardinal point may correspond to cardinal points on several of the images obtained with the photosensitive array in different poses. For a given cardinal point, the points of intersection of the multiple lines projected from the photosensitive arrays through the perspective centers of the camera lens may be determined using a best-fit method according to methods of optimization well known in the art, for example, by using least-squares minimization methods. Additional optimization of registration of the multiple images may be carried out, if desired, by providing targets on or near the object under test. Additional targets may be reflective targets or light emitting diodes, for example.

If the camera 1702 is a color camera, the reconstructed surface may be represented in color, or other texture attributes may be retrieved. Various features of light pattern, in addition to 3D surface profile, may be provided by this method. For example, an "X" marked on the surface of an object may be retrieved in addition to the general coordinates corresponding to the X.

In some cases, it may be known ahead of time that certain portions of surfaces being photographed are relatively smooth, in other words, that these portions do not have any sharp discontinuities or fine features. In these cases, it may be possible to use the established cardinal points to construct an unmeasured portion of the surface in three dimensions. For example, the cardinal points may fit smoothly onto a cylindrical shape over a portion of the surface, and so software may automatically provide the cylindrical shape.

In the case that an overall shape for a portion of a surface is known, it may be possible to project a captured image onto the surface. For example, suppose that the surface has a colored pattern that may be projected onto an assumed surface, which in a particular case might be a flat surface, for example. In this case, this pattern may be projected onto the assumed surface from each of images obtained for the camera in different poses (a pose being a combination of a three degree-of-freedom position and a three degree-of-freedom orientation). In this instance, the images would be expected to overlap on the surface. If this is not the case, it would indicate that the assumed shape is not correct, and a change to the shape should be made. In this instance, it may be a good practice to obtain additional cardinal points based on the images captured by the camera in the different poses. These additional cardinal points may then be used to more accurately determine the surface profile.

Processing of the camera data to obtain 3D surface coordinates may be supplemented with measurements made by a 3D tactile probe having a probe tip 118. Such tactile measurements may be useful to obtain data in holes or other regions not visible to the camera. It may also be useful in obtaining measurements of regions that do not readily show up as cardinal points through the image processing analysis.

As used herein, the terms "bus", "wire" and "conductor" in reference to bus 218 are used interchangeably to refer to a transmission medium for transmitting signals such as synchronizing pulses and/or data.

Technical effects and benefits include the ability to simultaneously transmit arm position signals on one bus and accessory device data on a high speed bus, such as an optical bus for example. This may lead to increased system performance and throughput by allowing more data to be collected in response to each capture signal. In addition, the AACMM 100 may be able to support a broader range of accessory devices by not requiring all accessory devices to be compliant with the internal bus utilized to collect position data.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, C# or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, may be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that may direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

While the invention has been described with reference to example embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for measuring three-dimensional (3D) coordinates of a surface comprising:
    providing a base;
    providing a manually positionable articulated arm portion having opposed first and second ends, the arm portion being rotationally coupled to the base at the second end, the arm portion including a plurality of connected arm segments, each of the arm segments including at least one angle transducer for producing an angle signal;
    providing a measurement device coupled to the first end, the measurement device including a camera having a lens and a photosensitive array;
    providing a projector coupled to the first end and operable to project an image on the surface;
    providing an electronic circuit configured to receive the angle signal from the at least one angle transducer for the plurality of connected arm segments and to provide data corresponding to a position and an orientation of the measurement device;
    providing a processor;
    sending to the processor from the electronic circuit first data corresponding to a first position and a first orientation of the measurement device, forming with the lens a first image of the surface on the photosensitive array, and sending a first digital signal to the processor in response;
    sending to the processor from the electronic circuit second data corresponding to a second position and a second orientation of the measurement device, forming with the lens a second image of the surface on the photosensitive array, and sending a second digital signal to the processor in response;

finding with the processor a first set of cardinal points common to the first image and the second image based at least in part on the first digital signal and the second digital signal;

finding with the processor a first set of locations on the photosensitive array and a second set of locations on the photosensitive array, the first set of locations corresponding to the first set of cardinal points in the first image and the second set of locations corresponding to the first set of cardinal points in the second image;

calculating a first set of 3D coordinates for the first set of cardinal points, the first set of 3D coordinates including 3D coordinates for each cardinal point of the first set of cardinal points, wherein the 3D coordinates for each cardinal point of the first set of cardinal points is based at least in part on the first data, the first set of locations, the second data, and the second set of locations;

determining an assumed shape based on the first 3D coordinates;

projecting at least one of the first image or second image onto the surface based at least in part on the assumed shape;

determining that the at least one of the first image or second image overlaps with the surface; and saving the first 3D coordinates.

2. The method of claim 1 wherein in the step of finding with the processor a first set of cardinal points, each cardinal point from the first set of cardinal points corresponds to a 3D feature of the surface.

3. The method of claim 1 wherein the step of finding with the processor a first set of cardinal points, at least some of the cardinal points are found by image processing of the first digital signal and the second digital signal.

4. The method of claim 3 wherein the step of finding with the processor a first set of cardinal points includes identifying an interest point.

5. The method of claim 4 wherein, in the step of finding with the processor a first set of cardinal points, the interest point is a corner.

6. The method of claim 3 wherein the step of finding with the processor a first set of cardinal points includes using a scale-invariant feature transform (SIFT).

7. The method of claim 1 wherein:
the step of providing a measurement device further includes providing a contact probe having a probe tip;
the method further includes a step of placing the probe tip at a third position, the probe tip placed in contact with the surface;
the method further includes a step of sending to the processor from the electronic circuit third data corresponding to the third position; and
the method further includes determining 3D coordinates of a center of the probe tip, the 3D coordinates based at least in part on the third data.

8. The method of claim 1 further including steps of:
providing a bus in electrical communication with at least one of the angle transducers and the measurement device, the bus including an encoder bus portion and a high speed bus portion;
providing a first serializer/deserializer coupled between the measurement device and the high speed bus portion that converts measurement data provided by the measurement device into serial form to form serial data;
providing a second electronic circuit configured to receive the measurement data; and
providing a second serializer/deserializer coupled between the high speed data portion and the second electronic circuit, the serializer/deserializer configured to convert the serial data back to the measurement data, wherein the first and second serializer/deserializers include transmit emphasis or receive equalization.

9. The method of claim 8 further including providing a rotary coupler having a first portion and a second portion, the second portion configured to rotate relative to the first portion, the first portion affixed to the first arm segment, the rotary coupler configured to transfer signals on both the encoder bus portion and the high speed bus portion between the first portion and the second portion.

10. The method of claim 9 wherein, in the step of providing a measurement device, the measurement device includes a laser line probe (LLP).

11. The method of claim 10 wherein, in the step of providing a measurement device, the LLP is configured to provide the measurement data in parallel form.

12. The method of claim 9 wherein, in the step of providing first and second serializer/deserializers, the first and second serializer/deserializers communicate according to at least one communication standard.

13. The method of claim 12, wherein the at least one communication standard is selected from the group consisting of:
Universal Serial Bus (USB) 1.0, USB 2.0, USB 3.0, Gigabit Ethernet (IEEE 802.3-2008 standard), Peripheral Component Interconnect (PCI) Express, FireWire, and Camera Link.

14. The method of claim 1, further comprising:
providing a color camera coupled to the first end; and
acquiring a texture with the color camera when the first image is acquired by the photosensitive array.

15. The method of claim 1, further comprising finding a second set of cardinal points in response to determining that the at least one of the first image or second image does not overlap with the surface.

16. The method of claim 1, further comprising:
providing a probe tip coupled to the first end;
touching the probe tip to the surface; and
determining a second set of 3D coordinates in response to touching the probe tip to the surface.

* * * * *